US012488159B2

(12) United States Patent
Cook et al.

(10) Patent No.: US 12,488,159 B2
(45) Date of Patent: Dec. 2, 2025

(54) METHOD FOR AUTOMATICALLY GENERATING DESIGN SOLUTIONS FOR AN ENGINEERING DESIGN PROJECT

(71) Applicant: Generative Vision Limited, Worcester (GB)

(72) Inventors: Laurence Cook, Worcester (GB); Joe Griston, Worcester (GB); Nick Arini, Worcester (GB); Nick Boultbee, Worcester (GB); Carlos Rodríguez-Toro, Worcester (GB); Glyn Stevens, Worcester (GB); Ian Mackenzie, Worcester (GB); Sam Phillips, Worcester (GB)

(73) Assignee: Generative Vision Limited, Worcester (GB)

( * ) Notice: Subject to any disclaimer, the term of this patent is extended or adjusted under 35 U.S.C. 154(b) by 0 days.

(21) Appl. No.: 18/965,863

(22) Filed: Dec. 2, 2024

(65) Prior Publication Data
US 2025/0181790 A1 Jun. 5, 2025

Related U.S. Application Data

(60) Provisional application No. 63/640,804, filed on Apr. 30, 2024, provisional application No. 63/604,766, filed on Nov. 30, 2023.

(51) Int. Cl.
*G06F 7/48* (2006.01)
*G06F 30/17* (2020.01)

(52) U.S. Cl.
CPC .................................. *G06F 30/17* (2020.01)

(58) Field of Classification Search
CPC ........................................................ G06F 30/17
See application file for complete search history.

(56) References Cited

U.S. PATENT DOCUMENTS 9,165,090 B2 * 10/2015 Broodney ............... G06F 30/20
2011/0098837 A1 * 4/2011 Yucel ...................... G06F 30/17
700/107

(Continued)

OTHER PUBLICATIONS

International Search Report and Written Opinion for International Patent Application No. PCT/IB24/000710 mailed on Feb. 27, 2025: 18 pages.

(Continued)

*Primary Examiner* — Nithya J. Moll
(74) *Attorney, Agent, or Firm* — Run8 Patent Group, LLC; Peter Miller

(57) ABSTRACT

One variation of a method includes: accessing a descriptor of a project; extracting a set of language signals from the descriptor; accessing a set of input parameters and a set of output characteristics; querying a language model for a range of values of input parameters exhibited within historical engineering solutions correlated with the set of language signals; accessing a virtual model for the project and a function representing a relationship between the set of input parameters and the set of output characteristics; for each analysis instance in a count of analysis instances, defining a combination of values of input parameters within corresponding ranges and based on the virtual model, the function, and the combination of values, executing the analysis instance to calculate a set of values of output characteristics; and rendering representations of combinations of values of input parameters and sets of values of output characteristics within a user interface.

20 Claims, 9 Drawing Sheets

(56) References Cited

U.S. PATENT DOCUMENTS

| | | |
|---|---|---|
| 2017/0293701 A1 | 10/2017 | Iorio et al. |
| 2018/0033435 A1 | 2/2018 | Jacobs et al. |
| 2018/0336723 A1* | 11/2018 | Elmer .................... G06F 30/20 |
| 2021/0019456 A1 | 1/2021 | Mirabella et al. |
| 2023/0281486 A1 | 9/2023 | Varro et al. |

OTHER PUBLICATIONS

Milin Kodnongbua et al: "Zero-shot CAD Program Re-Parameterization for Interactive Manipulation", arxiv.org, Cornell University Library, 201 Olin Library Cornell University Ithaca, NY14853, Jun. 5, 2023 (Jun. 5, 2023), XP091531158.

* cited by examiner

METHOD FOR AUTOMATICALLY GENERATING DESIGN SOLUTIONS FOR AN ENGINEERING DESIGN PROJECT

CROSS-REFERENCE TO RELATED APPLICATIONS

This application claims the benefit of U.S. Provisional Application No. 63/604,766, filed on 30 Nov. 2023, and 63/640,804, filed on 30 Apr. 2024, each of which is incorporated in its entirety by this reference.

TECHNICAL FIELD

This invention relates generally to the field of product design and more specifically to a new and useful method for automatically generating design solutions in the field of product design.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
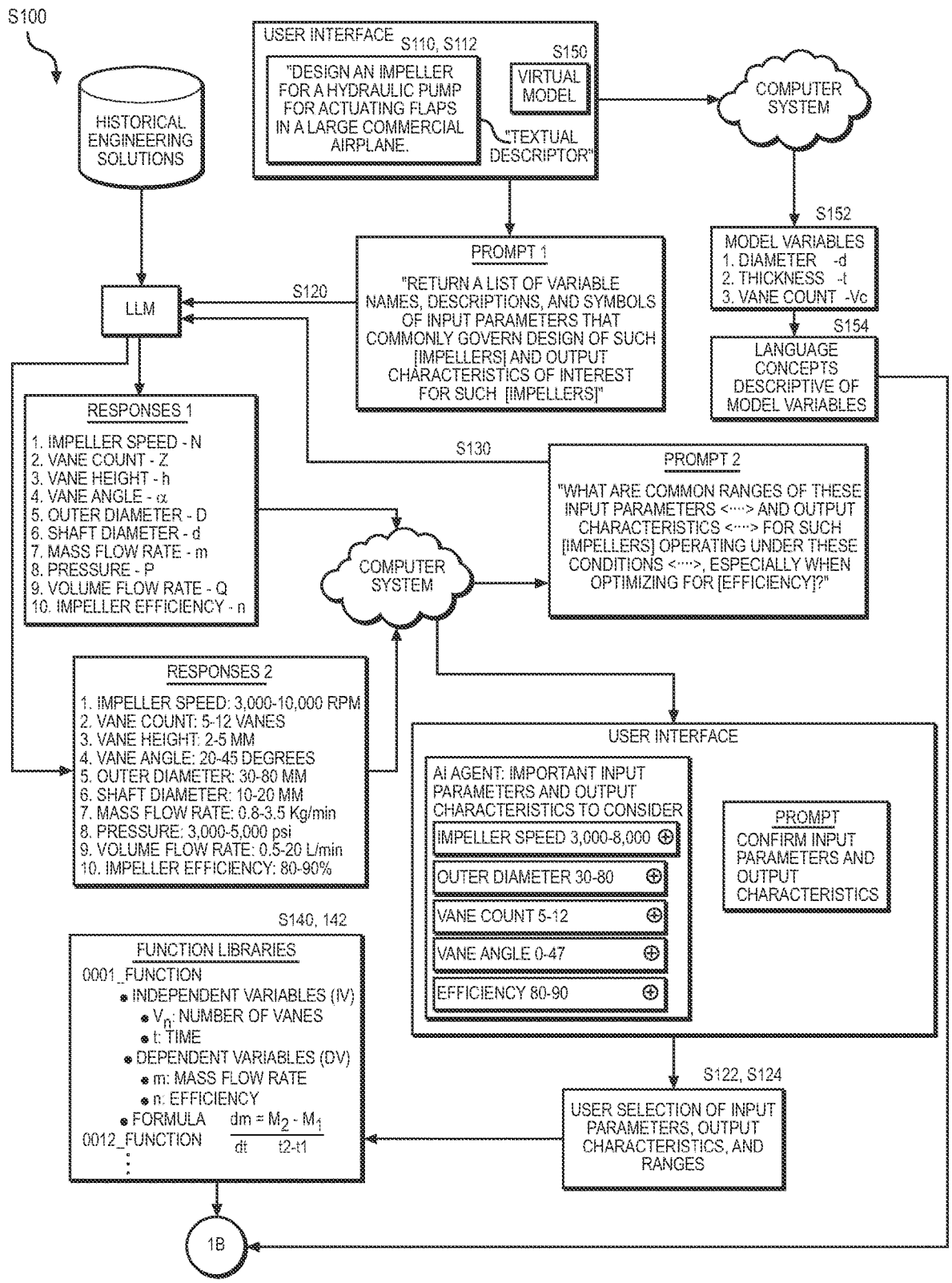
FIGS. 1A, 1B, and 1C are flowchart representations of a method.
Figure 1B:
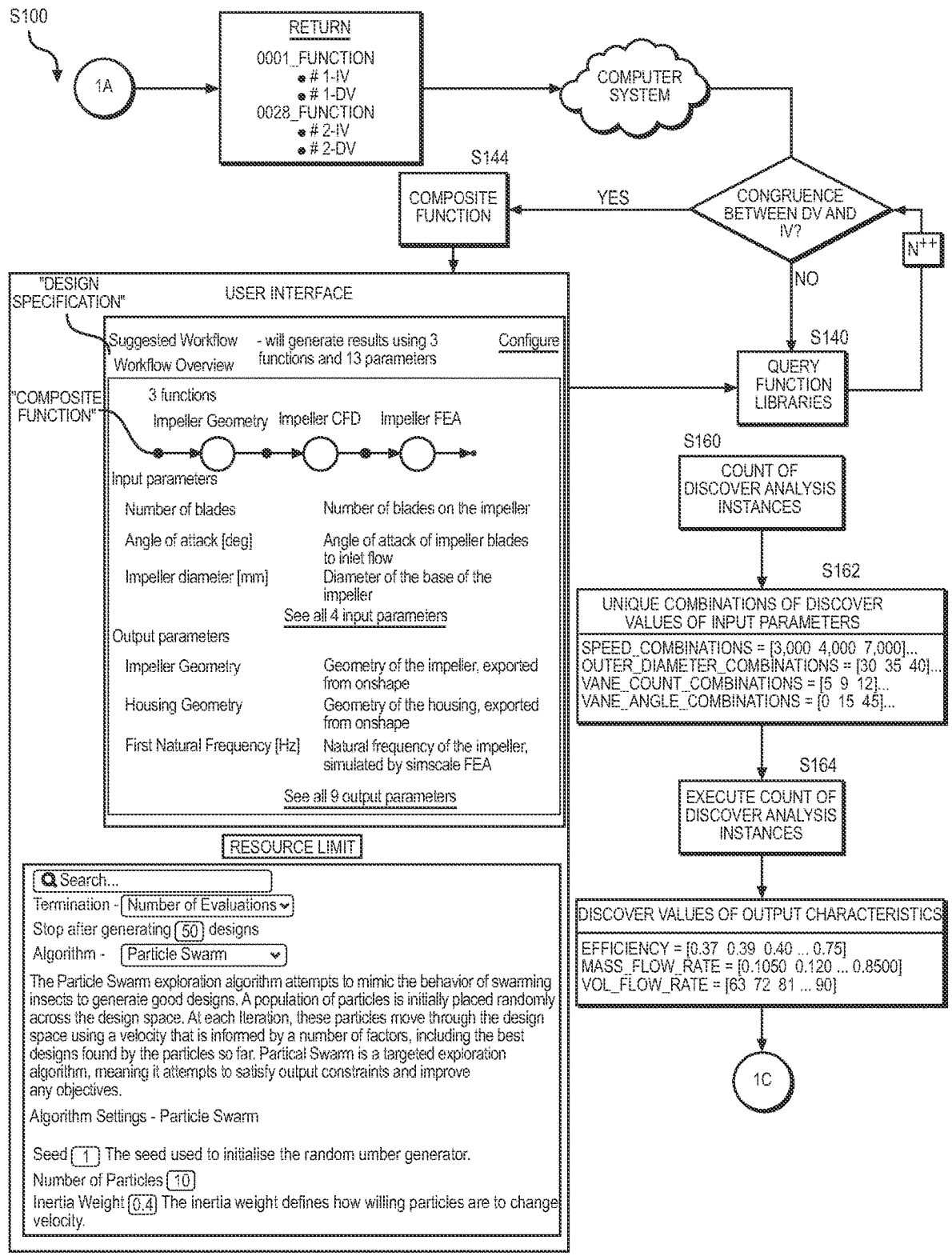
Figure 1C:
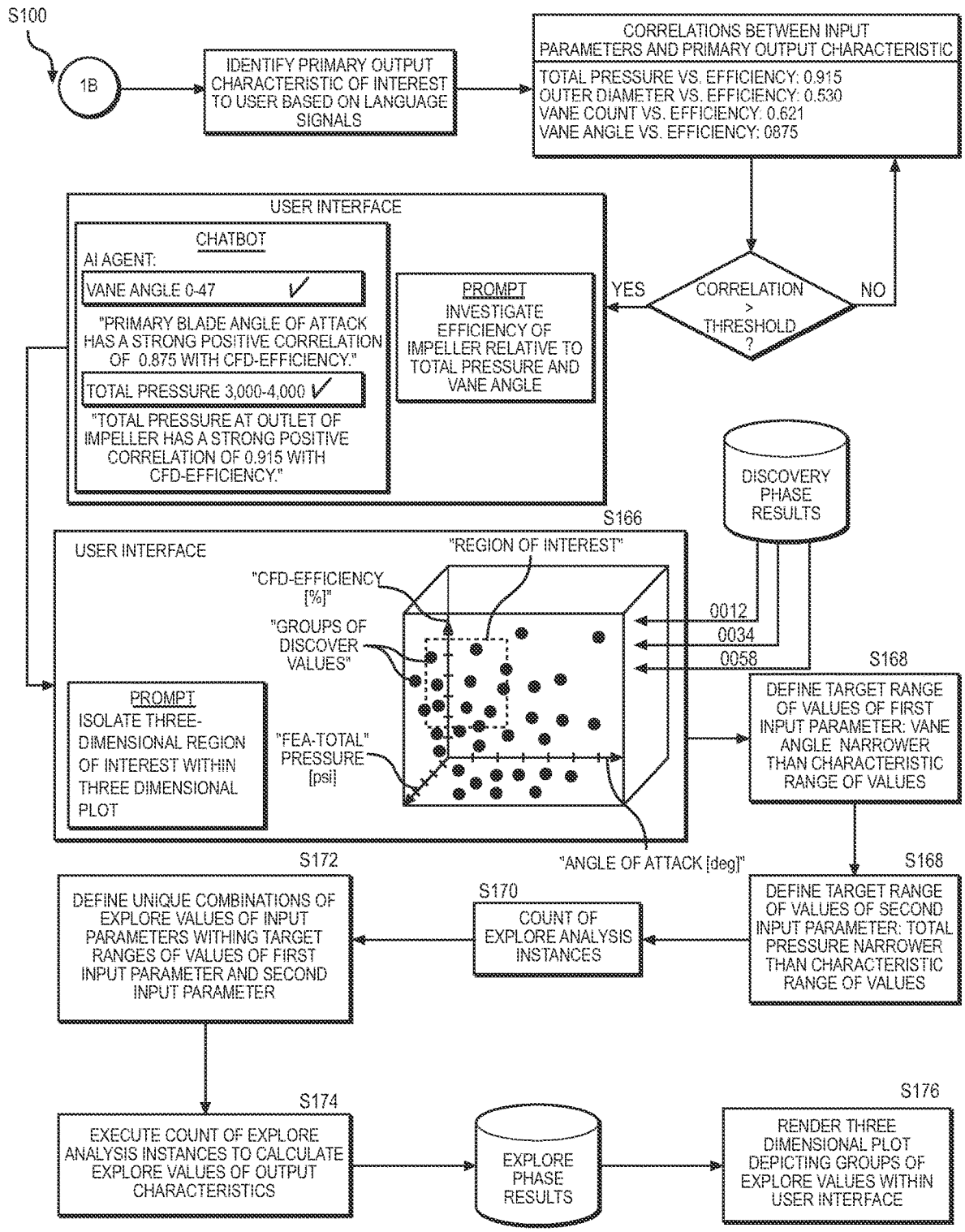

As shown in FIGS. 1A, 1B, and 1C a method includes: accessing a textual descriptor, supplied by a user, of an engineering design project in Block S110; extracting a first set of language signals from the textual descriptor in Block S112; accessing a set of input parameters and a set of output characteristics for the engineering design project in Block S120; and, for each input parameter in the set of input parameters, querying a language model for a characteristic range of values of the input parameter exhibited within historical engineering solutions correlated with the first set of language signals in Block S130.

The method S100 further includes: accessing a first set of composite functions representing relationships between the set of input parameters and the set of output characteristics in Block S140; accessing a virtual model representing a design solution for the engineering design project in Block S150; linking a set of model variables in the virtual model to a subset of input parameters in the set of input parameters in Block S152; and accessing a first count of discover analysis instances for the engineering design project in Block S160.

The method S100 further includes, for each discover analysis instance in the first count of discover analysis instances: defining a unique combination of discover values of input parameters within corresponding characteristic ranges of the set of input parameters in Block S162; based on the virtual model, the first set of composite functions, and the unique combination of discover values of input parameters, executing the discover analysis instance to calculate a set of discover values of the set of output characteristics in Block S164; and rendering representations of the unique combination of discover values of input parameters and the set of discover values of the set of output characteristics within a user interface in Block S166.

1.1 Variation: Virtual Model Influences Range Selection

One variation of the method S100, includes: accessing a virtual model representing a design solution for an engineering design project in Block S150; deriving a first set of language signals representing the engineering design project based on the virtual model in Block S112; accessing a set of input parameters and a set of output characteristics for the engineering design project in Block S120; for each input parameter in the set of input parameters, querying a language model for a characteristic range of values of the input parameter exhibited within historical engineering solutions correlated with the first set of language signals in Block S130; accessing a first set of composite functions representing relationships between the set of input parameters and the set of output characteristics in Block S140; linking a set of model variables in the virtual model to a subset of input parameters in the set of input parameters in Block S152; and accessing a first count of discover analysis instances for the engineering design project in Block S160.

This variation of the method S100 further includes, for each discover analysis instance in the first count of discover analysis instances: defining a unique combination of discover values of input parameters within corresponding characteristic ranges of the set of input parameters in Block S162; based on the virtual model, the first set of composite functions, and the unique combination of discover values of input parameters, executing the discover analysis instance to calculate a set of discover values of the set of output characteristics in Block S164; and rendering representations of the unique combination of discover values of input parameters and the set of discover values of the set of output characteristics within a user interface in Block S166.

1.2 Variation: Associations Between Model Variables and Input Parameters

One variation of the method S100 includes: accessing a textual descriptor of an engineering design project in Block S110; extracting a set of language signals from the textual descriptor in Block S112; accessing a set of input parameters and a set of output characteristics for the engineering design project in Block S120; querying a language model for a characteristic range of values of input parameters, in the set of input parameters, exhibited within historical engineering solutions correlated with the set of language signals in Block S130; accessing a composite function representing a relationship between the set of input parameters and the set of output characteristics in Block S140; accessing a virtual model representing a design solution for the engineering design project in Block S150; and accessing associations between a set of model variables in the virtual model and a subset of input parameters in the set of input parameters in Block S152.

This variation of the method S100 further includes, for each analysis instance in a count of analysis instances: defining a unique combination of values of input parameters within corresponding characteristic ranges in Block S162; and, based on the virtual model, the set of composite functions, and the unique combination of values of input parameters, executing the analysis instance to calculate a set of values of output characteristics in Block S164.

This variation of the method S100 also includes rendering representations of unique combinations of values of input parameters and corresponding sets of values of output characteristics, from the count of analysis instances, within a user interface in Block S166.

1.2 Variation: Function Library+Function Chaining

One variation of the method S100 includes: accessing a first natural language descriptor descriptive of a first input parameter in a set of input parameters selected for an engineering design project in Block S126; accessing a second natural language descriptor descriptive of a second output characteristic in a set of output characteristics selected for the engineering design project in Block S128; and querying a function library for a set of functions in Block S142, the set of functions including a first function defining a first independent variable represented by a first set of language concepts congruent with the first natural language descriptor and a second function defining a second dependent variable represented by a second set of language concepts congruent with the second natural language descriptor.

This variation of the method S100 further includes: linking the first function and the second function to form a composite function, in a set of composite functions, relating the first input parameter to the second output characteristic in Block S144; accessing a characteristic range of values of each input parameter in the set of input parameters in Block S130; accessing a virtual model representing a design solution for the engineering design project in Block S150; and linking a first model variable in the virtual model to the first input parameter in Block S152.

This variation of the method S100, further includes, for each discover analysis instance in a first count of discover analysis instances: defining a unique combination of discover values of input parameters within corresponding characteristic ranges of the set of input parameters in Block S162; based on the virtual model, the set of composite functions, and the unique combination of discover values of input parameters, executing the discover analysis instance to calculate a set of discover values of the set of output characteristics in Block S164; and rendering representations of the unique combination of discover values of input parameters and the set of discover values of the set of output characteristics within a user interface in Block S166.

1.4 Variation: Function Library+Function Chaining

One variation of the method S100 includes: accessing a textual descriptor, supplied by a user, of an engineering design project in Block S110; extracting a first set of language signals from the textual descriptor in Block S112; querying a language model for a corpus of input parameters and a corpus of output characteristics considered within historical engineering solutions correlated with the first set of language signals in Block S120; receiving selection of a set of input parameters, in the corpus of input parameters, from the user in Block S122; and receiving selection of a set of output characteristics, in the corpus of output characteristics, from the user in Block S124.

This variation of the method S100 further includes querying a function library for a set of functions in Block S142, the set of functions including: a first function defining a first independent variable corresponding to a first input parameter in the set of input parameters; and a second function defining a first dependent variable corresponding to a first output characteristic in the set of output characteristics.

This variation of the method S100 further includes: assembling a composite function based on the first function and the second function in Block S144; accessing a characteristic range of values of each input parameter in the set of input parameters in Block S130; accessing a virtual model representing a design solution for the engineering design project in Block S150; and linking a first model variable in the virtual model to the first input parameter in Block S152.

This variation of the method S100 further includes, for each discover analysis instance in a first count of discover analysis instances: defining a unique combination of discover values of input parameters within corresponding characteristic ranges of the set of input parameters in Block S162; based on the virtual model, the first composite function, and the unique combination of discover values of input parameters, executing the discover analysis instance to calculate a set of discover values of the set of output characteristics in Block S164; and rendering representations of the unique combination of discover values of input parameters and the set of discover values of the set of output characteristics within a user interface in Block S166.

1.5 Variation: Language Concept of Model Variable

One variation of the method S100 includes: accessing a virtual model representing a design solution for an engineering design project in Block S150; deriving a first language concept descriptive of a first model variable in a set of model variables in the virtual model in Block S154; and accessing a second natural language descriptor descriptive of a second output characteristic in a set of output characteristics selected for the engineering design project in Block S116.

This variation of the method S100 further includes, querying a function library for a set of functions in Block S142, the set of functions including: a first function defining a first independent variable represented by a first set of language concepts congruent with the first language concept; and a second function defining a second dependent variable represented by a second set of language concepts congruent with the second natural language descriptor.

This variation of the method S100 further includes: linking the first function and the second function to form a composite function, in a set of composite functions, relating the first model variable to the second output characteristic in Block S144; accessing a characteristic range of values of each model variables in the set of model variables in Block S130; and linking the first model variable in the virtual model to the first model variable in Block S152.

This variation of the method S100 further includes, for each discover analysis instance in a first count of discover analysis instances: defining a unique combination of discover values of model variables within corresponding characteristic ranges of the set of model variables in Block S162; based on the virtual model, the set of composite functions, and the unique combination of discover values of model variables, executing the discover analysis instance to calculate a set of discover values of the set of output characteristics in Block S164; and rendering representations of the unique combination of discover values of model variables and the set of discover values of the set of output characteristics within a user interface in Block S166.

2. Applications

Generally, Blocks of the method S100 can be executed by a computer system (e.g., a computer network, a remote computer system, a remote server): to receive a user input specifying a textual descriptor of an engineering design project from a user (e.g., "Help me design an impeller," "Design an airfoil for a long-distance flight path") and language signals representing user intent or context information for the engineering design project via a user interface; to identify input parameters and output characteristics for the engineering design project considered in historical engineering solutions correlated with the set of language signals; to automatically identify starting characteristic ranges of values of these input parameters; and to select functions from a function library (e.g., a public library, a proprietary library).

Accordingly, the computer system can: receive confirmation of input parameters and output characteristics from the user via the user interface; define characteristic ranges of values of input parameters; link model variables in a virtual model, representing a design solution for the engineering design project, to a subset of input parameters in the set of input parameters; assemble functions into a composite function (e.g., a comprehensive function) to relate input parameters and output characteristics; and access a count of discover analysis instances for the engineering design project.

The computer system can further, for each discover analysis instance: define a unique combination of discover values of input parameters within corresponding characteristic ranges of the set of input parameters; execute the discover analysis instance to calculate a set of discover values of the set of output characteristics; and render representations of discover values of input parameters and output characteristics within a user interface to enable the user to discover whether, how, and to what extent each input parameter may affect the engineering design project and a corresponding output characteristic.

2.1 Composite Function Assembly

The computer system can receive a set of output characteristics defined by the user for the engineering design project. The computer system can then implement structured data analysis techniques (e.g., linear regression analysis, cluster analysis, k-means clustering, and/or other statistical analysis and machine learning techniques) to: automatically generate a set of correlations between the set of input parameters and the set of output characteristics; and/or to automatically generate a set of correlations between independent variables and dependent variables defined in each function to relate particular input parameters and output characteristics.

The computer system can further rank each correlation in numerical order according to the importance of the input parameter and/or the order of magnitude of change in the output value of the output characteristic; and generate a composite function (e.g., a surrogate model via response surface modeling techniques) for the engineering design project by linking independent variables and dependent variables of these functions according to the highest-ranking correlations.

2.2 Automatic Range Finding

Furthermore, the computer system can: implement artificial intelligence, machine learning, and/or other techniques to search a corpus of scientific data in order to autonomously define ranges of values of input parameters and ranges of values of output characteristics, defined in each function and mapped to input parameters and output characteristics selected by the user; compile these ranges of values of input parameters and ranges of values of output characteristics for each function into a design specification for the engineering design project; and render a visual representation (e.g., a list, a table, a graphical outline) of the design specification within the user portal.

2.3 Specification: Confirmation of Parameters, Characteristics, and Ranges

Accordingly, the computer system can execute Blocks of the method S100: to automatically transform a user input specifying a set of natural language terms of an engineering design project into a comprehensive design specification unique to the engineering design project; to generate a recommendation for the user to explore possible designs of the part according to the design specification; and to present the design specification and the recommendation to the user.

Therefore, the computer system can execute Blocks of the method S100: to streamline a design workflow of engineering design project for a user who may exhibit limited knowledge of relationships of input parameters and output characteristics for the engineering design project, functions related to the engineering design project, and/or expected ranges of values of input parameters and output characteristics; and to organize design requirements in a visual layout, such as a design specification, that enables the user to rapidly understand the feasibility of design requirements of the engineering design project in order to a) explore many possible analysis instances for the engineering design project according to the design specification and b) complete the engineering design project while obviating manual research and design tests required by the user.

2.4 Discover: Presentation of Discover Analysis Results

The computer system can further: render a three-dimensional plot depicting groups of discover values of input parameters and output characteristics, a set of one-dimensional line graphs corresponding to discover values of input parameters and output characteristics, or a two-dimensional table populated with representations of discover values of input parameters and output characteristics within the user interface; and thereby, enable the user to view results of all discover analysis instances in a graphical visualization.

Accordingly, the user can review possible discover analysis results in a visualization (e.g., a two-dimensional table, a set of line graphs, a multi-dimensional plot) for the engineering design project and select a set of discover analysis results, paired with discover analysis instances, within the visualization for further development within narrow(ed) value ranges of input parameters and/or output characteristics entered by the user, thereby enabling the computer system to efficiently allocate computational resources to exploring possible analysis instances within ranges of values of input parameters and/or output characteristics of particular interest to the user—even without prior user knowledge of these input parameters and output characteristics.

2.5; Explore: Input Parameter+Output Characteristic Refinement

The user may then selectively target or prioritize further refinement of output characteristics by selecting a target region within the visualization and/or a output characteristic range for a single output characteristic (e.g., manufacturability) or multiple output characteristics (e.g., manufacturability, cost, stiffness, strength) of interest to the user. The computer system can further execute Blocks of the method S100: to receive selection of the target characteristic range for a particular output characteristic; and, in response to receiving selection of the output characteristic range, autonomously generate a new quantity of explore analysis instances for the engineering design project such that each explorer design solution exhibits an output characteristic approximating the target characteristic range and returns the visualization, populated with the new explore values of input parameters and output characteristics, to the user.

Accordingly, the computer system can return immediate and meaningful design solutions (e.g., discover analysis instances paired with discover analysis results, explore analysis instances paired with explore analysis results) for targeted research and development of the engineering design project given minimal input from the user and/or limited prior knowledge of possible design solutions, relationships of input parameters and output characteristics, and/or characteristic ranges of input parameters and output characteristics.

Therefore, the computer system can execute Blocks of the method S100 to streamline research and development of input parameters of an engineering design project to achieve output characteristics. Accordingly, the computer system enables a user: to quickly and repeatably model (or computationally develop, define, refine, analyze) the engineering design project according to a design specification; to discover possible design solutions for the engineering design project; to confirm and/or disconfirm values and relationships of input parameters and output characteristics; to review the feasibility of design requirements of the engineering design project; and to explore many design solutions for the engineering design project, including effects of many combinations of input parameters on output characteristics of the engineering design project (e.g., effects of geometry, thickness, and material on strength or weight, manufacturability, cost of manufacturing).

2.6 Model

In one implementation, the computer system executes Blocks of the method S100 in conjunction with a model (e.g., a large language model, a generative pre-trained transformer, an artificial intelligence model). The computer system: receives a user input for an engineering design project from a computing device associated with a user; and extracts a set of language signals from the user input. The computer system further cooperates with the model to: access a set of input parameters and a set of output characteristics for the engineering design project considered in historical engineering solutions correlated with the set of language signals; identify characteristic ranges of values of these input parameters exhibited in historical engineering solutions correlated with the set of language signals; and select functions from the function library(ies).

For example, the computer system can query the model for a set of input parameters and a set of output characteristics considered in historical engineering solutions correlated with the set of language signals by: populating a template prompt; serving the prompt to the model; and receiving a response from the model specifying the set of input parameters, the set of output characteristics, and corresponding language descriptors.

Accordingly, the computer system: identifies and presents input parameters and output characteristics to the user via the user interface; defines characteristic ranges of values of input parameters (e.g., queries the model for characteristic ranges of values of input parameters); links model variables in a virtual model, representing a design solution for the engineering design project, to a subset of input parameters in the set of input parameters; assembles functions into a composite function (e.g., a comprehensive function); and accesses a count of discover analysis instances for the engineering design project. The computer system further, for each discover analysis instance: defines a unique combination of discover values of input parameters within corresponding characteristic ranges of the set of input parameters; executes the discover analysis instance to calculate a set of discover values of the set of output characteristics; and renders representations of discover values of input parameters and output characteristics within a user interface.

The method S100 is described herein as executed by the computer system to enable a user to discover and explore possible design solutions for an engineering design project. However, the computer system can similarly execute Blocks of the method S100 to enable a user to discover and explore possible design solutions for an engineering design project, a component, an assembly, a part, or a system including many assemblies, parts, or components.

3. Terms+Glossary

Generally, an "engineering design project" is referred to herein as a project to design a part, a component, an assembly, a product, or a system according to a set of design requirements (e.g., performance, manufacturability, cost) supplied by a user.

Generally, a "textual descriptor" is referred to herein as a textual input (e.g., textual design requirements, a specification) describing the engineering design project and can include a set of language signals (e.g., natural language terms or keywords) representing user intent or context information for the engineering design project.

Generally, a "virtual model" is referred to herein as a parameterized computer-aided design model representing a design solution for the engineering design project. The parameterized computer-aided design model further includes "model variables," such as dimensions, constraints, or features, that define the geometry and relationships of the model. The computer system can further modify the "virtual model" via parametric computer-aided design scripting or computer-aided design automation scripting (e.g., programming scripting language, code).

Generally, an "input parameter" is referred to herein as an input variable for a function or a composite function and can include numbers, strings, objects, or any other type of data. Each input parameter is manually selected by the user or automatically selected by querying a model (e.g., a large language model, a generative pre-trained transformer, an artificial intelligence model).

Generally, an "output characteristic" is referred to herein as an output variable returned from a function or a composite function when executed based on the input parameter. Each output characteristic is manually selected by the user or automatically selected by querying a model (e.g., a large language model, a generative pre-trained transformer, an artificial intelligence model).

4. Example: Impeller for Wastewater Treatment

In one example, a user enters a textual descriptor of an engineering design project specifying a set of natural language terms, such as "Help me design an impeller for wastewater treatment" within a user interface, to design an impeller for a wastewater treatment application.

The computer system then: receives the textual descriptor; accesses a set of input parameters—such as a quantity of blades, an angle of attack, an impeller diameter, a null pressure at an inlet of the impeller, a null pressure at the outlet of the impeller, and a rotational velocity less than 600 radians-per-second—for the engineering design project; and accesses a set of output characteristics, such as mass flow rate of water and a natural frequency of the impeller, for the engineering design project.

The computer system queries a language model for a range of common values of the rotational velocity and a range of common values of the mass flow rate of water considered in historical engineering solutions and correlated with the set of language signals. The computer system then receives a response from the language model and, based on the response: automatically sets a first characteristic range of values for rotational velocity, such as between 100 radians-per-second and 500 radians-per-second; and automatically sets a second characteristic range of values for mass flow rate of water, such as between 4.2 kilograms-per-second and 5.2 kilograms-per-second.

The computer system further: accesses a function library; queries the function library for a first function, such as a computational fluid dynamics simulation for an impeller, associated with the set of language signals; queries the function library for a second function, such as a finite element method simulation for an impeller, associated with the set of language signals; and assembles these functions into a composite function for the engineering design project.

Accordingly, the computer system: compiles the set of input parameters, the set of output characteristics, ranges of values of input parameters, ranges of values of output characteristics, and the composite function into a design specification for the impeller; generates a recommendation to explore possible designs of the impeller according to the design specification; and renders the design specification for the impeller and the recommendation within the user portal for review by the user.

Therefore, the computer system can autonomously generate a design specification, defining ranges of values of input parameters and ranges of values of output characteristics for functions relevant to the engineering design project of interest to the user and thereby, recommend functions and ranges of values and output characteristics that may be unknown to the user and/or absent from the user input. Additionally, the computer system can guide the user toward possible impeller designs to evaluate the feasibility of design requirements, and to improve the efficiency of the design process of the impeller.

5. Function Library

Generally, the computer system can query a function library(ies) (e.g., a data repository) for a set of functions—each function in the set of functions defining independent variables and dependent variables associated with language concepts (e.g., symbols, formulas, units of measurement, comments).

More specifically, each function in the function library defines a set of independent variables (e.g., input variables) and a set of dependent variables (e.g., output variables). Each function can further include language concepts of each independent variable and dependent variable including: a symbol or value name (e.g., $T1$=temperature at first time, $T2$=second time, $Vn$=nominal velocity, $Vn$=number of vanes); a data type (e.g., floating-point number, an integer, a string); a unit of measurement (e.g., mm=millimeters, sqft=feet squared, ft^2=feet squared); a formula (e.g., $dm/dt = (m\_2 - m\_1) = (t\_2 - t\_1)$); and/or a set of natural language comments describing the symbol, formula, and/or unit of measurement.

In one implementation, the function library includes a corpus of public functions considered in historical engineering solutions for past engineering design projects. The public function library is accessible to all users. Each public function is manually generated, such as by a user (e.g., an engineer, an expert) for an engineering design project and then stored in the public function library. Each public function includes a set of symbols representing variables (e.g., independent variables, dependent variables); a formula; and a set of natural language comments describing the set of symbols and the formula. For example, each public function can include a manually-generated mathematical simulation, numerical model, and/or complex simulation (e.g., a finite element method simulation, a finite volume body fitted simulation, a computational fluid dynamics simulation).

In another implementation, the function library includes a corpus of proprietary functions (e.g., private functions) unique to a particular user or a particular organization including a corpus of users. The proprietary function library is accessible to a particular user or a corpus of users associated with a particular organization. Each proprietary function is manually generated, such as by a particular user (e.g., an engineer, an expert) or is supplied by the particular organization via a user interface and includes a set of symbols representing: variables (e.g., independent variables, dependent variables); a formula; and a set of natural language comments describing the set of symbols and the formula.

For example, a computational fluid dynamics expert may define a generic fluid dynamics function for an industrial impeller by defining: a set of boundary conditions; a hex mesh type; a material type of air for the impeller; and a set of rules for mapping the set of boundary conditions onto a virtual model of the impeller. The expert may further define an impeller computational fluid dynamics simulation—configured to calculate values for a dependent variable, such as mass flow rate. The expert may define a set of fixed independent variables, such as a null pressure at an inlet of the impeller, a null pressure at the outlet of the impeller, and a rotational velocity of 500 radians-per-second; and a set of independent variables, such as a quantity of blades, a base diameter, and an angle of attack for inlet flow for the impeller computational fluid dynamics simulation. The computer system can store this fluid dynamics function linked to the engineering design project within the function library.

6. User Input: Engineering Design Project Data

Block S110 of the method S100 recites accessing a textual descriptor, supplied by a user, of an engineering design project. Generally, in Block S110, the computer system can receive a textual description (e.g., a natural language text string) of an engineering design project for a part, a component, an assembly, or a system from a design interface (or "a user interface"). In particular, the computer system can receive a textual descriptor of the engineering design project, such as a textual project title or a textual descriptor specifying a set of natural language terms associated with the engineering design project.

In one implementation, the computer system receives a set of natural language search terms, entered by a user, representing a pending design problem for an engineering design project of interest to the user via the user interface.

In one example, the computer system receives—from a computing device accessed by a user (e.g., via the user interface)—a textual descriptor specifying a set of natural language search terms, such as "What design parameters are commonly considered for a hydraulic turbopump for moving flaps in commercial aircraft?What functional characteristics or results do engineers care about?"

In another example, the computer system receives a textual descriptor specifying a set of natural language search terms, such as "Help me design a pump for hydraulic fluid for an aircraft," from the user interface.

In yet another example, the computer system receives a textual descriptor specifying a set of natural language search terms, such as "Design an airfoil for a long-distance flight path," from the user interface.

Alternatively, the computer system can receive a visual descriptor (e.g., features extracted from a diagram or an image of an engineering design project), entered by a user, representing a pending design problem for an engineering design project of interest to the user via the user interface.

However, the computer system can access a textual descriptor, a visual descriptor, or any other type of descriptor representing a pending design problem for an engineering design project in any other way.

6.1 Context: Language Signals

Block S112 of the method S100 recites extracting a set of language signals from the textual descriptor. Generally, in Block S112, the computer system can implement natural language processing techniques to detect a set of language signals (e.g., natural language signals) in the textual descriptor.

In particular, the computer system can derive a design context representing a pending design problem of interest to the user from the set of language signals. For example, computer system can include a reasoning model configured to transform the set of natural language signals, specified in the textual descriptor entered by the user, into a machine-readable description of the engineering design project.

In one implementation, the computer system can: receive a textual descriptor specifying a set of natural language terms and apply the reasoning model to interpret an engineering design project and a design context from the set of natural language terms. For example, the computer system can: receive a textual descriptor specifying, "Help me design a pump for hydraulic fluid for an aircraft"; interpret the engineering design project for a target part from the textual descriptor, such as "a pump"; and extract a set of natural language signals in the textual descriptor, such as "hydraulic fluid for an aircraft."

Additionally or alternatively, the computer system can then apply the reasoning model: to transform the natural language description of the engineering design project, such as "a pump" into a first machine-readable result specifying the engineering design project; to transform the natural language description of the design context, such as "hydraulic fluid for an aircraft" into a second machine-readable result specifying the design context; and to combine the first machine-readable result and the second machine-readable result into a machine-readable description of the design problem.

In one variation, the computer system can receive additional textual descriptors—specifying additional details and/or constraints related to the engineering design project of interest to the user—as context information via the user interface.

For example, the computer system can: receive a textual descriptor specifying, "Help me design a hydraulic pump for an aircraft"; interpret the engineering design project from the textual descriptor, such as "a hydraulic pump"; and a second textual descriptor specifying a particular resonance frequency, a particular pressure increase, and a particular altitude such as, "avoid resonance frequencies between 100 Hertz and 200 Hertz and exhibit a 500 pounds-per-square-inch pressure increase at an altitude of 30,000 feet."

7. Input Parameters+Output Characteristics

Blocks S114, S116, and S120 of the method S100 recite: accessing a first natural language descriptor descriptive of a first input parameter in a set of input parameters selected for an engineering design project; accessing a second natural language descriptor descriptive of a second output characteristic in a set of output characteristics selected for the engineering design project; and accessing a set of input parameters and a set of output characteristics for the engineering design project.

Generally, the computer system can: query a model (e.g., a large language model, a generative pretrained transformer, an artificial intelligence model) for common input parameters and output characteristics considered in design of historical engineering solutions related to similar language signals; receive a response from the model specifying a corpus of input parameters and a corpus of output characteristics; and serve the corpus of input parameters and the corpus of output characteristics to the user via the user interface for selection.

In one implementation, the computer system queries a language model for common input parameters and common output characteristics considered in design of historical engineering solutions for parts, assemblies, or systems correlated with the set of language signals; and receives a response from the language model specifying a corpus of common input parameters and corresponding natural language descriptions (e.g., symbols, text strings, variable names). For example, the language model can return a response specifying geometric input parameters (e.g., vane count), dimensional input parameters (e.g., vane angle, vane height, outer diameter), and contextual input parameters (e.g., fluid density, impeller speed, fluid temperature, impeller material properties) for the engineering design project.

Furthermore, the computer system can present the corpus of input parameters, the corpus of output characteristics, and corresponding natural language descriptions within the user interface and prompt the user to select input parameters and output characteristics of interest to the user. Responsive to receiving confirmation of the set of input parameters and the set of output characteristics, the computer system populates a set of input parameters and a set of output characteristics for the engineering design project with the input parameters and output characteristics confirmed by the user.

In another implementation, the computer system can identify a set of input parameters and a set of output characteristics according to the set of language signals extracted from the textual descriptor of the engineering design project. For example, the computer system can: receive a textual descriptor specifying, "Help me design a hydraulic pump for an aircraft and optimize for efficiency"; extract a set of language signals from the textual descriptor, such as "optimize for efficiency"; and identify an output characteristic, such as efficiency, for the engineering design project according to the set of language signals.

7.1 Natural Language Descriptors+User Confirmation

Blocks S122, S124, S126, and S128 of the method S100 recite: receiving selection of a set of input parameters, in the corpus of input parameters, from the user; receiving selection of a set of output characteristics, in the corpus of output characteristics, from the user; accessing a natural language descriptor descriptive of an input parameter in a set of input parameters selected for an engineering design project; and accessing a natural language descriptor descriptive of an output characteristic in a set of output characteristics selected for the engineering design project.

Generally, the computer system can: receive natural language descriptors describing each input parameter and output characteristic from the language model and present the corpus of input parameters, the corpus of output characteristics, and corresponding natural language descriptors to the user within the user interface. The computer system can then receive selection of a set of input parameters and a set of output characteristics from the user via the user interface.

In one variation, the computer system: queries the language model for input parameters and output characteristics considered in design of historical engineering solutions correlated with the set of language signals; receives a first natural language descriptor of an input parameter, in a corpus of input parameters, from the language model; receives a second natural language descriptor of an output characteristic, in a corpus of output characteristics, from the language model; generates a prompt for the user to confirm the input parameter; and presents the first natural language descriptor of the input parameter and the prompt within the user interface. Responsive to confirmation of the input parameter by the user (e.g., via the user interface), the computer system populates the set of input parameters with this input parameter.

The computer system then: generates a prompt for the user to confirm the output characteristic; and presents the second natural language descriptor of the output characteristic and the prompt within the user interface. Responsive to confirmation of the output characteristic by the user (e.g., via the user interface), the computer system populates the set of output characteristics with this output characteristic.

The computer system repeats these methods and techniques for each other natural language descriptor of each input parameter, in the corpus of input parameters, and for each output characteristic, in the corpus of output characteristics, received from the language model to identify a set of input parameters and a set of output characteristics for the engineering design project.

In another variation, the computer system: queries the language model for output characteristics considered in design of historical engineering solutions correlated with the set of language signals; receives a corpus of output characteristics and corresponding natural language descriptions from the language model; presents the corpus of output characteristics and corresponding natural language descriptions within the user interface; and prompts the user to confirm the set of output characteristics, from the corpus of output characteristics, via the user interface.

In yet another variation, the computer system: receives a virtual model representing a design solution for the engineering design project; detects a set of model variables within the virtual model; derives a second set of language signals based on the set of model variables; queries the language model for input parameters considered in design of historical engineering solutions correlated with the first set of language signals and the second set of language signals; receives a corpus of input parameters and corresponding natural language descriptions from the language model; presents the corpus of input parameters and corresponding natural language descriptions within the user interface; and prompts the user to confirm the set of input parameters, from the corpus of input parameters, via the user interface.

7.2 Secondary Input Parameters+Secondary Output Characteristics

Furthermore, the computer system can query the language model for secondary input parameters and output characteristics considered in historical engineering design solutions correlated with the set of language signals and the natural language descriptor of each input parameter and output characteristic returned by the language model.

In the foregoing variation, responsive to confirmation of the input parameter and the output characteristic by the user via the user interface, the computer system further queries the language model for secondary input parameters and secondary output characteristics considered in design of historical engineering solutions correlated with the set of language signals, the first natural language descriptor, and the second natural language descriptor. The computer system then: receives a third natural language descriptor of a secondary input parameter from the language model; receives a fourth natural language descriptor of a secondary output characteristic from the language model; generates a prompt for the user to confirm the secondary input parameter; and presents the third natural language descriptor of the secondary input parameter and the prompt within the user interface. Responsive to confirmation of the secondary input parameter by the user (e.g., via the user interface), the computer system populates the set of output characteristics with the secondary input parameter.

The computer system then: generates a prompt for the user to confirm the secondary output characteristic; and presents the fourth natural language descriptor of the secondary output characteristic and the prompt within the user interface. Responsive to confirmation of the secondary output characteristic by the user (e.g., via the user interface), the computer system populates the set of output characteristics with the secondary output characteristic.

Additionally or alternatively, the computer system can receive additional queries from the user via the user interface, such as "What other output characteristics may trade off with efficiency?" and populate a secondary template prompt specifying instructions and a particular format for the language model. The computer system can then serve the secondary template prompt to the language model for execution; receive a second response, from the language model, specifying secondary input parameters and secondary output characteristics for the engineering design project; present these secondary input parameters, secondary output characteristics, and corresponding natural language descriptions within the user interface; and prompt the user to confirm input parameters and output characteristics from these secondary input parameters and output characteristics.

Accordingly, the computer system can assign priority to input parameters and output characteristics according to a numerical order of confirmed (e.g., selected) input parameters and output characteristics by the user and/or according to a numerical order of presented input parameters and output characteristics by the computer system to the user (e.g., responsive to each user query).

Therefore, the computer system can: query a language model for input parameters, output characteristics, and corresponding natural language descriptions considered in historical engineering solutions; present these input parameters, output characteristics, and natural language descriptions to the user; and populate a set of input parameters and a set of output characteristics with input parameters and output characteristics selected by the user via the user interface. Additionally, the computer system can receive queries from the user to search for secondary input parameters and/or output characteristics of particular interest to the user or that may tradeoff with the previously-selected output characteristics. The computer system can further update the set of input parameters and the set of output characteristics with secondary input parameters and output characteristics selected by the user, respectively.

7.3 Example: Impeller+Commercial Airplane

In one example, the computer system: receives a textual descriptor for an engineering design project, specifying "I am designing an impeller for a hydraulic pump for actuating flaps in a large commercial airplane. I am preparing to run FEA on my CAD model"; extracts a set of language signals from the textual descriptor, such as "hydraulic pump," "actuating flaps in a large commercial airplane," and "run FEA on my CAD model"; populates a template prompt instructing the model, such as "return a list of variable names, descriptions, and symbols of input parameters that commonly govern design of such [impellers] and output characteristics of interest for such [impellers]"; and serves the template prompt to the language model for execution.

Accordingly, the language model generates a list of input parameters and output characteristics—annotated with variable names, descriptions, and symbols—for impellers based on the template prompt; and returns a response, to the computer system, specifying the list of input parameters and output characteristics. For example, the response specifying the list of input parameters and output characteristics can include: "1. Impeller speed—N; 2. Vane count—Z; 3. Vane height—h; 4. Vane angle—α; 5. Outer diameter—D; 6. Shaft diameter—d; 7. Mass flow rate—m*; 8. Pressure—P; 9. Volume flow rate—Q; 10. Resonant frequency—f_n; 11. Fluid density—ρ; 12. Fluid viscosity—p; 13. Impeller efficiency—η; 14. Torque—T; and 15. Power—P_w."

The computer system then: presents the corpus of input parameters, the corpus of output characteristics, and corresponding natural language descriptions within the user interface; and prompts the user to select a set of output characteristics, from the corpus of output characteristics, and a set of input parameters, from the corpus of input parameters, via the user interface. In response to receiving selection of the set of input parameters and the set of output characteristics, the computer system records the set of input parameters and the set of output characteristics for the engineering design project.

Additionally or alternatively, the computer system can populate the template prompt with a particular format in a set of formats (e.g., natural language text, machine readable text). The language model can then generate the response specifying the list of input parameters and output characteristics—annotated with variable names, descriptions, and symbols—and exhibiting the particular format based on the template prompt.

8. Characteristic Range of Values Selection

Block S130 of the method S100 recites, for each input parameter in the set of input parameters, querying a language model for a characteristic range of values of the input parameter exhibited within historical engineering solutions correlated with the set of language signals. Generally, in Block S130, the computer system can query the language model for a characteristic range of values of each input parameter exhibited within historical engineering solutions and associated with the set of language signals.

In particular, the computer system can query the language model for characteristic ranges of values of geometric input parameters (e.g., vane count of an impeller), dimensional input parameters (e.g., vane height or outer diameter of an impeller), contextual input parameters (e.g., scalar values of viscosity, air, temperature, gravity), and output characteristics (e.g., efficiency of the impeller).

In one implementation, the computer system can: populate a template prompt specifying, "what are common ranges of these input parameters [ . . . ] and output characteristics [ . . . ] for a [ . . . ] in the field of [ . . . ] for [ . . . ] operating under these conditions [ . . . ], especially when optimizing for [critical output characteristic]"; serve the prompt to the language model; and automatically set characteristic ranges of values of input parameters and output characteristics based on a response from the language model.

For example the computer system can: populate a prompt template specifying, "what are common ranges of these input parameters [vane count, vane height, outer diameter, oil viscosity] and output characteristics [efficiency] for a [impeller of a hydraulic pump] in the field of [commercial aviation] for [operating flaps] operating under these conditions [takeoff, landing, and cruising at 35,000 ft];" serve the prompt template to the language model; receive a response from the language model; extract a first characteristic range of values for vane count from the response; extract a second characteristic range for vane height from the response; extract a third characteristic range of values for outer diameter from the response; extract a fourth characteristic range of values for oil viscosity from the response; extract a fifth characteristic range of values for efficiency of the impeller; and automatically set characteristic ranges of values for these input parameters and output characteristics.

Therefore, the computer system can query the language model for common ranges of values of input parameters and/or output characteristics and automatically set characteristic ranges of values for these input parameters and output characteristics based on a response from the language model. By automatically setting characteristic ranges of values of input parameters and output characteristics for the engineering design project, the computer system enables a user—who may exhibit limited knowledge of relationships of input parameters and output characteristics for the engineering design project—to quickly access and understand expected ranges of values of input parameters and output characteristics exhibited within historical engineering solutions.

8.1 Scalar Value Selection

In one variation, the computer system can implement methods and techniques described above for scalar (i.e., singular) values of contextual input parameters. In particular, the computer system can query the language model for contextual input parameters that are invariant. For example, the computer system can query the language model for a characteristic range of values of modulus of elasticity, material density, operating temperature, oil dynamic viscosity, and oil density etc.

In one implementation, the computer system can: populate a template prompt specifying, "what are common ranges of these input parameters [oil dynamic viscosity and oil density] for a [impeller of a hydraulic pump] in the field of [commercial aviation] for [operating flaps] operating under these conditions [takeoff, landing, and cruising at 35,000 ft];" serve the prompt to the language model; and automatically set characteristic ranges of values, including scalar values, of these contextual input parameters based on a response from the language model.

8.2 Missing Ranges of Values from Language Model

In one implementation, the computer system can query the language model for characteristic range of values of input parameters and/or output characteristics for the engineering design project. Responsive to a missing range of values for an input parameter or an output characteristic, the computer system can populate a template prompt instructing the language model to access one (or multiple) resource databases and scan this resource database for the missing characteristic range of values exhibited in these resource databases and correlated with the set of language signals. The computer system can then receive a response from the language model specifying values of the missing input parameter or output characteristic and automatically set a characteristic range of values of the input parameter or output characteristic based on the response from the language model.

Additionally or alternatively, responsive to a missing input parameter or an output characteristic specified in a response from the language model, the computer system can further query the language model to access one (or multiple) resource databases and scan this resource database for the missing input parameter or output characteristic associated with the engineering design project and correlated with the set of language signals; and return a range of values of each missing input parameter and a range of values of each missing output characteristic from these scientific data. The computer system can then automatically set a characteristic range of values of each missing input parameter or output characteristic.

8.2.1 Resource Database+Autonomously-Defined Input Value Ranges

In one variation, the computer system can submit a query—to a search engine (or other data source) via an application programming interface—for a set of scientific data associated with the engineering design project and the set of language signals. The computer system can then: scan the scientific data for keywords associated with each input parameter; and autonomously define a range of values of each input parameter from these scientific data.

Furthermore, the computer system can submit a query to a search engine (or other data source) for scientific paper results, journal publication results, mechanical properties data results, virtual model data results, material properties data results, chemical properties data results, cost analysis data results, manufacturing data results, fluid mechanics data results, thermodynamics data results, transportation data results, structural analysis data results, control system data results, aerodynamics data results, geometry data results, computer-aided design model results, and/or environmental data results from one or more resource databases.

For example, the computer system can: identify missing values of a set of input parameters, such as a quantity of blades and a base diameter of an impeller, for the engineering design project within a response from the language model; and submit a query—to a search engine (or other data source) via an application programming interface—for a set of fluid dynamics data associated with an impeller. The computer system can further scan the fluid dynamics data for keywords (e.g., "quantity of blades for an impeller," "number of blades for an impeller," "impeller blades," "amount of blades for an impeller," "quantity of vanes for an impeller," "number of vanes for an impeller," "impeller vanes," or "amount of vanes for an impeller") associated with a range of missing values of an input parameter, such as quantity of blades; extract a set of values (e.g., two, three, four, six, seven, and eight) of the quantity of blades from these fluid dynamics data; and automatically define a range of values encompassing the set of values for the quantity of blades, such as between two and eight.

The computer system can repeat the methods and techniques described above for each other missing range of values of input parameters to automatically set and recommend characteristic ranges of values of input parameters. The computer system can further guide a user toward discovering design analysis instances, within these characteristic ranges of values, for the engineering design project, as further described below.

Therefore, the computer system can autonomously set characteristic ranges of values of input parameters absent from a response returned by the language model and thereby, enable a user to quickly access and discover expected values of input parameters without manually researching and defining ranges for these values.

8.2.2 Search Engine+Autonomously-Defined Output Value Ranges

In one variation, the computer system can submit a query—to a search engine (or other data source) via an application programming interface—for a set of scientific data associated with the engineering design project and the set of language signals. The computer system can then: scan the scientific data for keywords associated with each output characteristic; and autonomously define a range of values of each output characteristic from these scientific data.

In the foregoing example, the computer system can: identify missing values of an output characteristic, such as mass flow rate of water, for the engineering design project within a response from the language model; and submit a query—to a search engine (or other data source) via an application programming interface—for a set of fluid dynamics data associated with an impeller. The computer system can further scan the fluid dynamics data for keywords (e.g., "mass flow rate of water," "volumetric flow rate of an impeller," "density of water," "volumetric flow rate of a pump," "capacity of an impeller," or "capacity of a pump") associated with the output characteristic, such as mass flow rate of water; extract a set of values, such as 625 gallons-per-minute, 885 gallons-per-minute, and 1250 gallons-per-minute, of the mass flow rate of water from these fluid dynamics data; and define a characteristic range encompassing the set of values for the impeller, such as between 600 gallons-per-minute and 1300 gallons-per-minute.

The computer system can repeat the methods and techniques described above for each other missing output characteristic to autonomously define and recommend ranges of values of output characteristics, and thereby, guide a user to discovering design analysis instances, within these characteristic ranges of values, for the engineering design project, as further described below.

Therefore, the computer system can autonomously set characteristic ranges of values of output characteristics absent from a response returned by the language model and thereby, enable a user to quickly access and discover expected values of output characteristics without manually researching and defining ranges for these values.

9. Function Retrieval+Composite Function Assembly

Blocks S140, S142, and S144 of the method S100 recite: accessing a set of composite functions representing relationships between the set of input parameters and the set of output characteristics; querying a function library for a set of functions—including a first function defining a first independent variable represented by a first set of language concepts congruent with the first natural language descriptor and a second function defining a second dependent variable represented by a second set of language concepts congruent with the second natural language descriptor; and assembling a composite function based on the first function and the second function.

Generally, the computer system can: query the function library(ies) for functions defining independent and/or dependent variables associated with language concepts congruent with natural language descriptors of the set of input parameters and the set of output characteristics selected by the user; and assemble these functions into a composite function (e.g., a comprehensive function) according to congruence between language concepts of each function. In particular, the computer system can query a public library for generic or general engineering design functions representing relationships between the set of input parameters and the set of output characteristics. Alternatively, the computer system can query a proprietary library for functions unique to the user or the user's organization representing relationships between the set of input parameters and the set of output characteristics.

More specifically, each function in the function library defines a set of independent variables (e.g., input variables) and a set of dependent variables (e.g., output variables). Each function can further include characteristics of each independent variable and dependent variable including: a symbol; a data type; a unit of measurement; a formula; and/or a set of natural language comments describing the independent variable or dependent variable. The computer system can query the function library(ies) for a set of functions for the engineering design project and implement structured data analysis techniques (e.g., linear regression analysis, cluster analysis, k-means clustering, and/or other statistical analysis and machine learning techniques) to automatically link the set of functions into a composite function according to correlations between the set of functions.

In one implementation, the computer system generates a natural language prompt specifying the textual descriptor for the engineering design project, an additional textual descriptor (e.g., context information) for the engineering design project, and a request or an instruction for the language model to return a set of functions required to calculate the set of output characteristics selected by the user. For example, the computer system can generate a natural language prompt specifying: the textual descriptor, such as "We are designing an impeller for a hydraulic pump for actuating flaps in a large commercial aircraft"; context information, such as "We are preparing to run FEA on a CAD model"; and instructions for the language model, such as "return a list of functions from the public and proprietary function libraries in order to calculate mass flow rate, pressure, volume flow rate, efficiency, and resonant frequency as a function of impeller speed, vane count, vane height, vane angle of attack, outer diameter, and shaft diameter."

Accordingly, the computer system: receives a response from the language model specifying a set of functions; connects a first function and a second function to form a composite function responsive to an output of the second function corresponding (e.g., matching, identical) to an input of the first function; populates a template prompt for a composite function, such as "given these input parameters [ . . . ], assemble functions in the public and private function libraries into a set of composite functions that return these output characteristics [ . . . ]"; and serves the template prompt to the language model.

9.1 Composite Function Assembly: Linking Two Functions+ Congruence

In one variation, the computer system executes Blocks of the method S100 to receive a first natural language descriptor of an input parameter from the language model and to receive a second natural language descriptor of an output characteristic from the language model. The computer system then queries a function library for a first function defining: a first independent variable associated with a first set of language concepts congruent with the first natural language descriptor of the input parameter; and a first dependent variable associated with a second set of language concepts. The computer system further: queries the function library for a second function defining: a second independent variable associated with a third set of language concepts; and a second dependent variable associated with language concepts congruent with the second natural language descriptor of the second output characteristic.

Figure 5A:
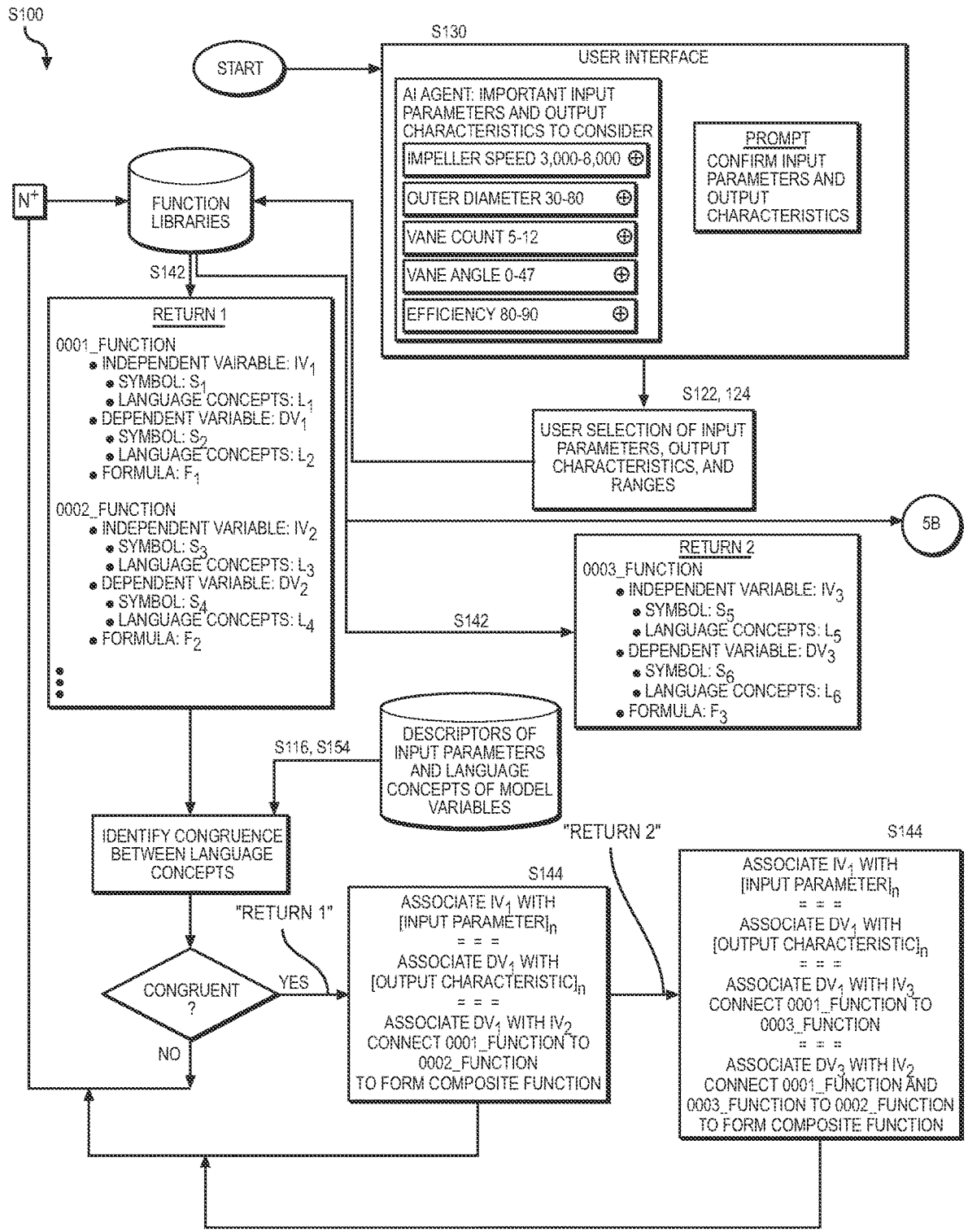
FIGS. 5A and 5B are flowchart representations of one variation of the method.

In one implementation, the computer system: receives a first function defining an independent variable corresponding to an input parameter in the set of input parameters from the language model; receives a second function defining a dependent variable corresponding to an output characteristic in the set of output characteristics from the language model; and links the first function and the second function to form a composite function, in a set of composite functions, relating the input parameter to the output characteristic. Based on congruence (e.g., a match, correspondence) between language concepts associated with the independent variable of the first function and the dependent variable of the second function, the computer system can: connect the first function and the second function to form a composite function; associate the independent variable with an input parameter; and associate the dependent variable with an output characteristic, as shown in FIGS. 1B and 5A.

For example, the computer system can: receive a first function—defining a first independent variable associated with a first set of language concepts and a first dependent variable associated with a second set of language concepts—from the language model; and receive the second function—defining a second independent variable associated with a third set of language concepts and a second dependent variable associated with a fourth set of language concepts—from the language model. Responsive to congruence between the first set of language concepts and the first natural language descriptor of the first input parameter, the computer system can associate the first independent variable in the first function with the input parameter. Responsive to congruence between the fourth set of language concepts and the second natural language descriptor of the second output characteristic, the computer system can associate the second dependent variable in the second function with the output characteristic. Responsive to congruence between the second set of language concepts and the third set of language concepts, the computer system can: associate the first dependent variable in the first function with the second independent variable in the second function; and connect the first function and the second function to form a composite function that relates the input parameter with the output characteristic.

Additionally or alternatively, the computer system can interpret symbols and natural language comments defined in a code for each function and derive language concepts from these symbols and comments. The computer system can then assemble a set of functions into a composite function according to correlations (e.g., direct or inverse relationships) between language concepts exceeding a threshold. For example, the computer system can: access a function returned by the function library; detect a symbol, of an independent variable, in the function; and derive a set of language concepts, from a natural language comment adjacent the symbol in the function.

Therefore, the computer system can identify congruence (e.g., a match, correspondence) between language concepts associated with variables (e.g., independent variables, dependent variables) defined in a set of functions in order to assemble the set of functions, returned by the language model, into a composite function.

9.2 Composite Function Assembly: Linking Three Functions

In one variation, the computer system: receives an intermediate function—defining an intermediate independent variable and an intermediate dependent variable—from the language model; and links the intermediate function between a set of functions to form a composite function.

In the foregoing example, the computer system can: receive the first function—defining the first independent variable associated with the first set of language concepts and the first dependent variable associated with the second set of language concepts—from the language model; and receive the second function—defining the second independent variable associated with the third set of language concepts and the second dependent variable associated with the fourth set of language concepts—from the language model. Based on congruence between language concepts, the computer system can: associate the first independent variable in the first function with the first input parameter; and associate the second dependent variable in the second function with the second output characteristic.

The computer system can further receive an intermediate function—defining an intermediate independent variable associated with a fifth set of language concepts and an intermediate dependent variable associated with a sixth set of language concepts—from the language model. Responsive to congruence between the third set of language concepts and the fifth set of language concepts, the computer system can: associate the first dependent variable in the first function with the intermediate independent variable in the intermediate function; and connect the first function to the intermediate function. Responsive to congruence between the fourth set of language concepts and the sixth set of language concepts, the computer system can: associate the intermediate dependent variable in the intermediate function with the second independent variable in the second function; and connect the first function and the intermediate function to the second function to form the composite function.

Therefore, the computer system can connect a set of (e.g., two) functions with an intermediate function in order to assemble a composite function. Additionally, the computer system can detect congruence between language concepts associated with dependent variables and independent variables across a set of functions to form a composite function that relates one (or more) input parameter to one (or more) output characteristic for the engineering design project.

9.2 Composite Function Assembly: Absence of Correspondence

In one variation, the computer system queries the function library(ies) for a function that defines a dependent variable associated with a set of language concepts congruent with a natural language descriptor of an output characteristic, in the set of output characteristics, selected by the user. Responsive to absence of correspondence between language concepts of an independent variable, defined in the function, with natural language descriptors of the set of input parameters, the computer system queries the function library(ies) for an additional function that defines an independent variable associated with a set of language concepts congruent with a natural language descriptor of an input parameter. The computer system then links the first function and the second function to form a composite function that relates the output characteristic to the input parameter.

The computer system can repeat these methods and techniques to expand the composite function for the output characteristic until all independent variables of the composite function correspond to input parameters selected by the user. Alternatively, the computer system can repeat these methods and techniques to expand the composite function for the output characteristic until all possible functions are received from the function library(ies).

Accordingly, the computer system can prompt the user to: confirm additional input parameters; and manually set a characteristic range of values for the last independent variable of the composite function. In one implementation, the computer system populates the set of input parameters with the last independent variable of the composite function. In another implementation, the computer system: automatically populates a template prompt specifying the textual descriptor for the engineering design project and a set of instructions for the language model to return a range of common values for the last independent variable of the composite function. For example, the computer system can: populate a template prompt specifying the textual descriptor, such as hydraulic pump for aircraft, of the engineering design project and a set of instructions for the language model to return a range of common values for the last independent variable, such as a modulus of elasticity of aluminum, of the composite function; receive a range of common values for the modulus of elasticity of aluminum from the language model; and set a characteristic range of values of the last independent variable of the composite function based on the range of common values.

9.3.1 Example: Link Output Characteristic to One or More Input Parameters

In one example, the computer system: queries the function library for a first function that returns a dependent variable congruent with a natural language descriptor of an output characteristic selected by the user; and, in response to the function library returning the function, detect an independent variable in the first function. The computer system then: extracts a set of language concepts describing the independent variable from the first function; and, in response to absence of correspondence between the set of language concepts and natural language descriptors of the set of input parameters selected by the user, query the function library for a second function that returns a second dependent variable congruent with the set of language concepts. Responsive to the function library returning the second function, the computer system connects the first function and the second function to form a composite function.

The computer system can further: detect a second independent variable in the first function; extract a second set of language concepts describing the second independent variable from the first function; and, in response to absence of correspondence between the second set of language concepts and natural language descriptors of the set of input parameters selected by the user, query the function library for a third function that returns a second dependent variable congruent with the second set of language concepts.

Responsive to the function library returning the third function, the computer system can form a composite function by: connecting the third function and the first function; and connecting the first function and the second function.

Figure 5B:
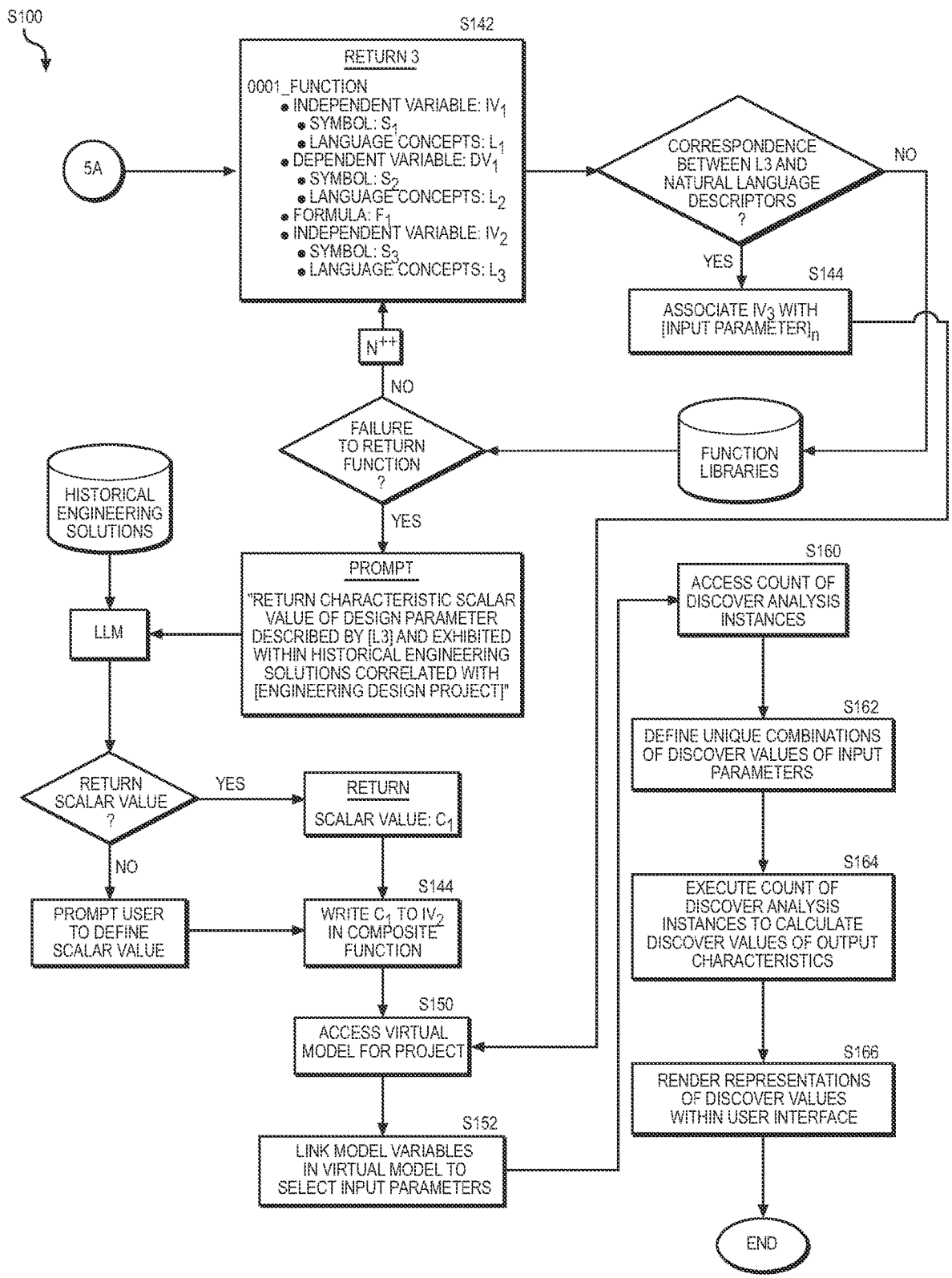

Additionally, the computer system can: detect a third independent variable in the first function; extract a third set of language concepts describing the third independent variable from the first function; and, in response to absence of correspondence between the third set of language concepts and natural language descriptors of the set of input parameters selected by the user, query the function library for a third function that returns a third dependent variable congruent with the third set of language concepts. Responsive to failure of the function library to return the third function, the computer system can: query the language model for a characteristic scalar value of a design parameter described by the third set of language concepts and exhibited within historical engineering solutions correlated with the engineering design project. Responsive to the function library returning the characteristic scalar value, the computer system can write the characteristic scalar value to the third independent variable in the composite function, as shown in FIG. 5B.

Therefore, the computer system can identify absence between language concepts describing an independent variable within a function to natural language descriptors of input parameters selected by the user. The computer system can query the function library for a function that returns a dependent variable congruent with the language concepts and assemble these functions into a composite function responsive to the function library returning the function. Alternatively, responsive to failure of the function library to return a function (e.g., function missing or absent in the function library), the computer system can populate a template prompt for the language model to return a common scalar value (e.g., a fixed value) and write this common scalar value to the independent variable.

9.4 Composite Function Assembly: Symbols, Comments, Language Concepts

In one implementation, the computer system can query the function library(ies) for: a first function defining a first value name of a dependent variable represented by a first set of language concepts congruent with a first natural language descriptor of a first input parameter; and a second value name of an independent variable of a second function represented by a second set of language concepts congruent with a second natural language descriptor of a second output characteristic. The first set of language concepts can represent a first unit of measurement, a first comment, and a first value name of the dependent variable of the first function. The second set of language concepts can represent a second unit of measurement, a second comment, and a second value name of the independent variable of the second function.

The computer system can then: identify correspondence (e.g., a match) between the first set of language concepts and the second set of language concepts; and link the first function and the second function to form a composite function—relating the first input parameter and the second output characteristic—based on correspondence between the first set of language concepts and the second set of language concepts. In this implementation, the computer system can generate a correlation score exhibiting an integer value between 0 and 10. Alternatively, the computer system can generate a correlation score exhibiting a decimal value between 0 and 1.

For example, the computer system can: retrieve a function including an independent variable symbol associated with a comment; derive a set of language concepts from the independent variable symbol and the comment; derive a correlation score (e.g., 0.8) representing the strength of an inverse or direct relationship between the set of language concepts and a natural language descriptor of the input parameter; and, in response to the correlation score (e.g., 0.8) exceeding a threshold correlation score (e.g., 0.65), select the function for assembly into the composite function and link the independent variable symbol in the function to the input parameter.

Additionally, the computer system can: calculate a similarity score representing correspondence between the first set of language concepts and the second set of language concepts; and, in response to the similarity score exceeding a threshold score, link the dependent variable of the first function to the independent variable of the second function. Alternatively, the computer system can: calculate a contradiction score representing "discrepancy" between the first set of language concepts and the second set of language concepts (e.g., number of vanes, vane count, quantity of vanes); and, in response to the contradiction score falling below a threshold score, link the dependent variable of the first function to the independent variable of the second function.

In another implementation, the computer system can select a set of functions associated with a design context corresponding to the target design context and match a first data type of an dependent variable of a first function to a second data type of an independent variable of the second function. The computer system can then: calculate a similarity score representing correspondence between the first data type and the second data type; and, in response to the similarity score exceeding a threshold score, link the dependent variable of the first function to the independent variable of the second function.

In yet another implementation, the computer system can select a set of functions associated with a design context corresponding to the target design context and match a first unit of measurement of an dependent variable of the first function to a second unit of measurement of an independent variable of the second function. The computer system can then: calculate a similarity score representing correspondence between the first unit of measurement and the second unit of measurement; and, in response to the similarity score exceeding a threshold score, link the dependent variable of the first function to the independent variable of the second function.

For example, the computer system can: select a set of (e.g., two) functions associated with a design context corresponding to the target design context; extract a first set of independent variables from a first function in the set of functions; and extract a second set of independent variables from a second function in the set of functions. Then, for a first independent variable from the first function, the computer system can: calculate a similarity score between the first independent variable and each other independent variable, in the second set of independent variables, of the second function; identify a second independent variable, in the second set of independent variables, with the greatest similarity score to the first independent variable; and, in response to this similarity score exceeding an intermediate score range (e.g., 50-90%), automatically link the first independent variable of the first function and the second independent variable of the second function.

Alternatively, in response to this similarity score falling within the intermediate score range (e.g., 50-90%), the computer system can: generate a recommendation to connect the first independent variable of the first function and the second independent variable of the second function; and serve the recommendation within the user interface. Upon user confirmation of the recommendation, the computer system can automatically link the first independent variable of the first function and the second independent variable of the second function. Upon user disconfirmation of the recommendation, the computer system can: repeat these methods and techniques for a third independent variable of the second function associated with a next greatest similarity score.

The computer system can implement the methods and techniques described above for each other independent variable in the first function and for each other dependent variable in the first function in order to automatically link independent variables and/or dependent variables defined in these functions.

9.5 Undefined Variables

In one implementation, the computer system can: receive a set of functions for the engineering design project; detect absence of an independent variable defined in the function; and generate and serve a prompt for the user to define the independent variable within the user interface. The computer system can then receive the independent variable within the user interface and update the function with this independent variable.

In one variation, the computer system can: receive a function from the function library; detect absence of a dependent variable defined in the function (e.g., a missing dependent variable); and, in response to detecting the missing dependent variable in the function, generate a prompt for the user to define the dependent variable and render this prompt within the user interface. The computer system can then: access the dependent variable within the user interface; replace the missing dependent variable with the dependent variable, defined by the user, within the function; and update the function within the function library.

9.6 Autonomous Function Assembly: Link Functions

In one variation, the computer system can populate a template prompt specifying a set of instructions for the language model to assemble functions stored in the public and proprietary libraries into a set of composite functions according to input parameters and output characteristics selected by the user. The computer system can then serve the template prompt to the language model and receive a set of composite functions for the engineering design project. For example, the computer system can access a template prompt, such as "given these input parameters [ . . . ], assemble functions in the public and private function libraries into a set of composite functions that return these output characteristics [ . . . ]"; and populate the template prompt with input parameters and output characteristics previously selected by the user.

In one implementation, the computer system can receive a set of function from the function library and match a first value name of an dependent variable of a first function, in the set of functions, to a second value name of an independent variable of a second function, in the set of functions. The computer system can further implement the language model to: interpret a first set of language concepts from a first unit of measurement, a first comment, and a first value name of the dependent variable of the first function; interpret a second set of language concepts from a second unit of measurement, a second comment, and a second value name of the independent variable of the second function; identify correspondence (e.g., a match) between the first set of language concepts and the second set of language concepts; and link the first function and the second function based on correspondence between the first set of language concepts and the second set of language concepts. Additionally, the computer system can: calculate a similarity score representing correspondence between the first set of language concepts and the second set of language concepts; and, in response to the similarity score exceeding a threshold score, link the dependent variable of the first function to the independent variable of the second function. Alternatively, the computer system can: calculate a contradiction score representing "discrepancy" between the first set of language concepts and the second set of language concepts (e.g., number of vanes, vane count, quantity of vanes); and, in response to the contradiction score falling below a threshold score, link the dependent variable of the first function to the independent variable of the second function.

In another implementation, the computer system can receive a set of function from the function library and match a first data type of an dependent variable of a first function to a second data type of an independent variable of the second function. The computer system can then: calculate a similarity score representing correspondence between the first data type and the second data type; and, in response to the similarity score exceeding a threshold score, link the dependent variable of the first function to the independent variable of the second function.

In yet another implementation, the computer system can receive a set of function from the function library and match a first unit of measurement of an dependent variable of the first function to a second unit of measurement of an independent variable of the second function. The computer system can then: calculate a similarity score representing correspondence between the first unit of measurement and the second unit of measurement; and, in response to the similarity score exceeding a threshold score, link the dependent variable of the first function to the independent variable of the second function.

For example, the computer system can: access a set of (e.g., two) functions from the function library; extract a first set of independent variables from a first function in the set of functions; and extract a second set of independent variables from a second function in the set of functions. Then, for a first independent variable from the first function, the computer system can: calculate a similarity score between the first independent variable and each other independent variable, in the second set of independent variables, of the second function; identify a second independent variable, in the second set of independent variables, with the greatest similarity score to the first independent variable; and, in response to this similarity score exceeding an intermediate score range (e.g., 50-90%), automatically link the first independent variable of the first function and the second independent variable of the second function.

Alternatively, in response to this similarity score falling within the intermediate score range (e.g., 50-90%), the computer system can: generate a recommendation to connect the first independent variable of the first function and the second independent variable of the second function; and serve the recommendation within the user interface. Upon user confirmation of the recommendation, the computer system can automatically link the first independent variable of the first function and the second independent variable of the second function. Upon user disconfirmation of the recommendation, the computer system can: repeat these methods and techniques for a third independent variable of the second function associated with a next greatest similarity score.

The computer system can implement the methods and techniques described above for each other independent variable in the first function and for each other dependent variable in the first function in order to automatically link independent variables and/or dependent variables defined in these functions.

9.7 Function Correlations+Rank Correlations

Generally, the computer system can automatically generate a set of correlations between the set of input parameters and the set of output characteristics selected by the user. The computer system can then automatically define ranges of values of input parameters for the set of correlations.

More specifically, the computer system can rank each correlation in the set of correlations in numerical order according to the importance of the input parameter and/or the order of magnitude of change in the output value of the output characteristic. The computer system can then implement methods and techniques described above to automatically define ranges of values of input parameters for a highest-ranking set of correlations.

In one implementation, the computer system can: receive a set of functions from the function library; generate and serve a prompt for the user to define a set of output characteristics for the engineering design project within the user interface; and automatically generate a set of correlations between the set of input parameters defined in each function and each output characteristic. The computer system can then: implement methods and techniques described above to automatically define ranges of values of input parameters for the highest-ranked correlations; and link the set of functions in a sequential order responsive to correspondence (e.g., a match) between sets of correlations defined in each function.

In one variation, the computer system can select a set of functions from the function library and generate and serve a prompt for the user to define one (or more) output characteristics f for the engineering design project. The computer system can then: access a set of correlations, stored within each function in the function library, between input parameters and output characteristics of each function; select a highest-ranking set of correlations from the function library; access a resource database; and scan this resource database for scientific data associated with the engineering design project and the design context linked to each function. The computer system can then define a range of values of each input parameter and a range of values of each output characteristic for the highest-ranking set of correlations of each function based on these scientific data.

For example, the computer system can: select an impeller fluid dynamics function from the function library linked to an industrial mechanics design context; extract a set of variable input parameters, such as a quantity of blades and a base diameter of the impeller, from the impeller fluid dynamics function; extract an output characteristic, such as mass flow rate of water; and generate and serve a prompt for the user to define a set of output characteristics for the engineering design project within the user interface. The computer system can then: receive a set of output characteristics, such as "minimize cost and minimize weight," from the user interface; select a highest-ranking set of correlations between the set of variable input parameters, such as a quantity of blades, a base diameter, and a material type for the impeller, and the target set of output characteristics from the function library; and access a corpus of impeller fluid dynamics data. The computer system can then define a range of values for each input parameter based on the corpus of impeller fluid dynamics data.

10. Virtual Model

Blocks S150 and S152 of the method S100 recite: accessing a virtual model representing a design solution for the engineering design project; and linking a first model variable in the virtual model to the first input parameter. Generally, in Blocks S150 and S152, the computer system can: access a computer-aided design model or a parameterized computer-aided design model supplied by the user via the user interface; access a template computer-aided design model from a public or proprietary virtual model library; and/or generate parametric computer-aided design scripting or computer-aided design automation scripting (i.e., code for generating a parameterized computer-aided design model).

In particular, the user may upload a virtual model, such as a parameterized computer-aided design model, representing a design solution for the engineering design project. The virtual model can further include a set of model variables that define geometry, dimensions, and material properties of the virtual model within the user portal. The computer system can then: access the virtual model of the part; extract a set of model variables from the virtual model of the part; and link the set of model variables to corresponding geometric input parameters and dimensional input parameters previously selected by the user.

In one implementation, the computer system: queries the language model for a first input parameter characteristic considered in design of historical engineering solutions correlated with the set of language signals; receives a first natural language descriptor of the first input parameter from the language model; and receives a parameterized computer-aided-drafting model from the user via the user interface. The computer system then: detects a first model variable, in a set of model variables, in the parameterized computer-aided-drafting model; extracts a first language concept from a string of symbols defining the first model variable in parameterized computer-aided-drafting model; calculates a first correspondence between the first language concept and the first natural language descriptor; and, in response to the first correspondence exceeding a threshold, links the first input parameter to the first model variable.

10.1 Automatic Input Parameter Mapping: Language Signals

In one variation, the computer system can: extract language signals from model variables in the virtual model and/or from parametric computer-aided design scripting of the virtual model; derive correlations between these model variables and language signals; and link model variables to input parameters based on strengths of these correlations.

For example, the computer system can calculate a confidence score representing correspondence between an input parameter and a model variable proportional to: similarity of symbols associated with the input parameter and the model variable; or similarity of natural language comments of the input parameter and the model variable. The computer system can repeat these methods and techniques for each other input parameter in the set of input parameters and each other model variable in the virtual model.

Then, for each input parameter in the set of input parameters, the computer system can: identify a model variable with the highest confidence score; and, in response to the confidence score exceeding a threshold score, map the input parameter to the model variable. Alternatively, in response to the confidence score falling below the threshold score, the computer system can generate a prompt for the user: to manually select a model variable that corresponds to the input parameter; to manually input a fixed value for the input parameter; or to update the virtual model to include a model variable that corresponds to the input parameter. The computer system can then repeat this process for each other input parameter to link the set of input parameters with the set of model variables in the virtual model.

In one implementation, the computer system can: isolate geometric and dimensional input parameters from the set of input parameters; identify independent variables defined in the set of functions according to symbols, formulas, and natural language comments; extract a set of model variables from the virtual model; identify user-defined model variables that represent the dimensions, geometry, and/or material properties of the virtual model (e.g., length, width, height, hole diameter, angle, wall thickness, pattern count, pattern offset); extract paired symbols and names of model variables (e.g., v_c "vane count", v_h "vane height", v_a "vane angle", v_t "vane thickness", d_shaft "shaft diameter", Od "outer diameter", b_t "base thickness") from the virtual model; and implement the language model to match geometric and dimensional input parameters to independent variables of the set of functions and to the set of model variables from the virtual model.

10.2 Automatic Input Parameter Mapping: Computer Vision

Figure 3:
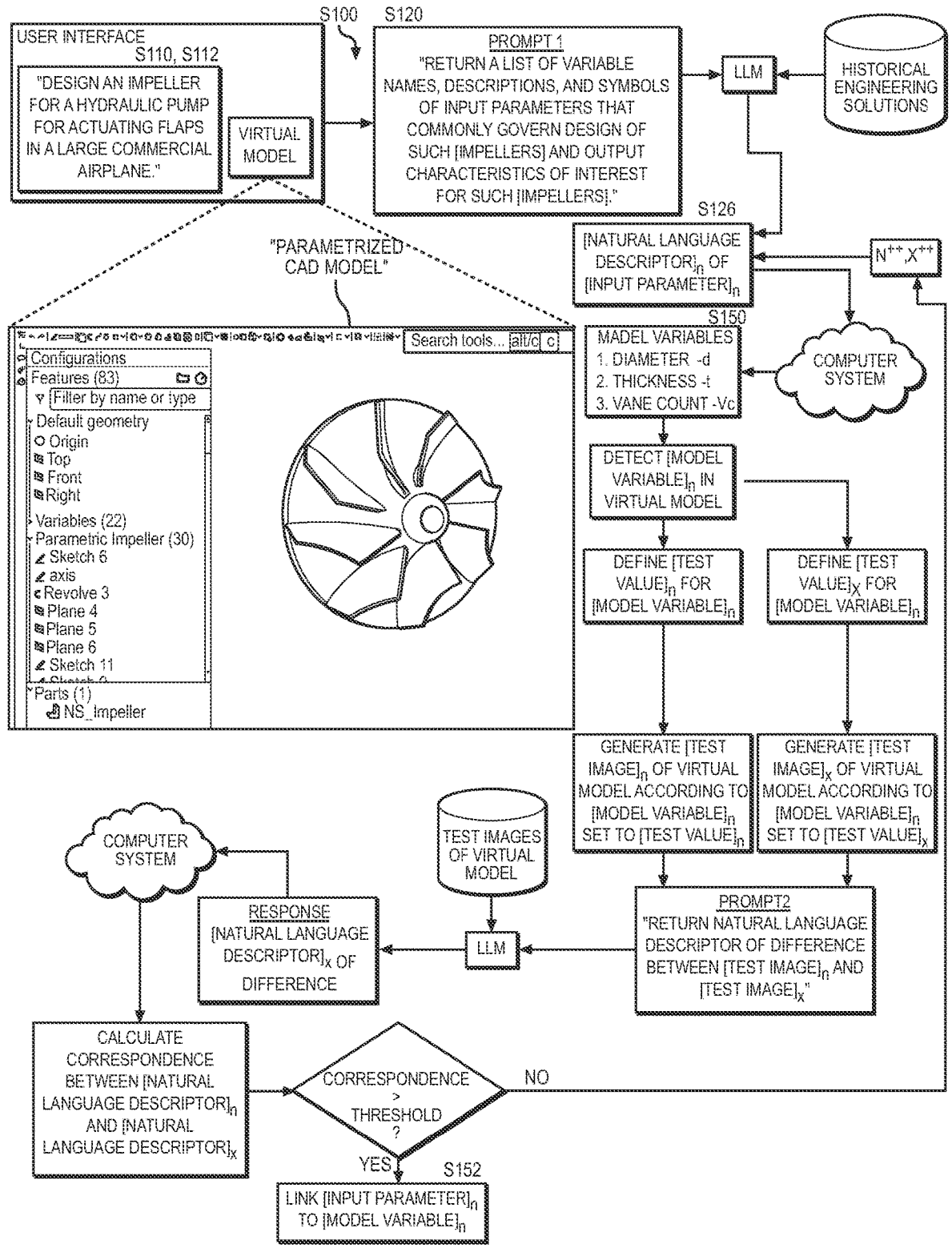
FIG. 3 is a flowchart representation of one variation of the method.

In another implementation, the computer system: queries the language model for a first input parameter considered in design of historical engineering solutions correlated with the set of language signals; receives a first natural language descriptor of the first input parameter from the language model; and receives a parameterized computer-aided-drafting model from the user via the user interface. The computer system then: detects a model variable, in the set of model variables, in the virtual model; and defines a set of test values for each model variable, such as 1%, 10%, 50%, 100%, 200%, 500% of the current or nominal value of the model variable in the virtual model (or indicated in the parametric computer-aided design scripting, such as in a comment), as shown in FIG. 3.

Furthermore, for each test value in the set of test values, the computer system: updates the virtual model according to corresponding test value in the set of test values; and, in response to generation of a model instance (e.g., a modified virtual model), captures a test image of the model instance in a target perspective (e.g., front upper left isometric) or a set of perspectives. The computer system then: generates a set of test images; and queries the language model to interpret a type of geometric or dimensional difference across this set of test images. For example, the computer system can populate a prompt with the set of input parameters, the set of test images, a value of each model variable corresponding to each test image, and a set of instructions to identify a particular input parameter strongly correlated with or matched to geometric or dimensional differences present across the set of test images. The computer system can then link the particular input parameter, returned by the language model, to the corresponding model variable. Alternatively, the computer system can implement the foregoing methods and techniques for model variables not directly matched to input parameters based on language signals.

In one variation, the computer system: queries the language model for an input parameter considered in design of historical engineering solutions correlated with the set of language signals; receives a natural language descriptor of the input parameter from the language model; and receives a parameterized computer-aided-drafting model from the user via the user interface. The computer system then: detects a model variable, in the set of model variables, in the virtual model; defines a first test value and a second test value, different from the first test value, for the first model variable; generates a first image of the virtual model rendered according to the first model variable set to the first test value; and generates a second image of the virtual model rendered according to the first model variable set to the second test value.

The computer system further: queries the language model for a second natural language descriptor of a difference between the first image and the second image; calculates a correspondence between the natural language descriptor and the second natural language descriptor; and, in response to the correspondence exceeding a threshold, linking the input parameter to the model variable.

Therefore, the computer system can query the language model to characterize model changes across the set of test images and match a description of these changes to a natural language descriptor of a corresponding input parameter and to link the set of input parameters with the set of model variables.

10.2 Variation: Library-Sourced Virtual Model

Generally, the computer system can retrieve an existing virtual model from a virtual model library, such as a template virtual model stored in a virtual model database or data repository. In particular, the computer system can: generate a set of search terms based on the textual engineering design project descriptor; query a virtual model library for a template virtual model according to the set of search terms; and load a nearest template virtual model, that meets the set of search terms, from the virtual model library.

In one variation, the computer system can: detect absence of model variable in the function (e.g., a missing model variable or an undefined model variable); and query the template virtual model library, storing template virtual models defining geometries, dimensions, and material properties of parts from previous engineering design solutions entered by public users, for a template virtual model that defines the missing model variables. The computer system can receive the template virtual model from the template virtual model library and define the missing model variable according to the template virtual model.

For example, the computer system can: receive a virtual model representing a design solution for an impeller from the user interface; detect an undefined model variable, such as a maximum head for the impeller, in the virtual model; query the template virtual model library for a template virtual model that defines the maximum head for the impeller; define the missing model variable, such as a 22-meter maximum head, based on the template virtual model; generate a prompt for the user to confirm the 22-meter maximum head; and render the prompt within the user portal.

Therefore, the computer system can query a template virtual model library for a template virtual model in order to automatically define a missing model variable in a user-supplied virtual model rather than prompting a user to manually define the missing model variable.

11. Design Specification+Recommendation

Generally, the computer system can compile the set of input parameters, the set of output characteristics, ranges of values, ranges of values, a set of functions and/or a composite function into a design specification for the engineering design project and return the design specification for the engineering design project to the user interface.

In one implementation, the computer system can: compile the set of input parameters, the set of output characteristics, ranges of values, ranges of values, a set of functions and/or a composite function into a design specification for the engineering design project; transform the design specification into human-readable text via the reasoning model; generate a visual representation of the design specification (e.g., a list, a table, a graphical outline)—defining ranges of values of input parameters, and ranges of values of output characteristics for the set of functions—for the engineering design project; generate a recommendation for the user to explore possible designs of the part specified in the engineering design project according to the design specification; and present the visual representation of the design specification for the engineering design project and the recommendation within the user interface for the user to review.

Therefore, the computer system can: compile ranges of values of input parameters, ranges of values of output characteristics, a set of functions, and/or a composite function into a design specification, specifying human-readable text, and render a visual representation of the design specification within the user interface. Thus, by automatically generating a design specification for the engineering design project, the computer system enables the user to quickly understand the feasibility of design requirements of the engineering design project in order to explore many possible analysis instances for the engineering design project.

12. Discovery Phase

Block S160 of the method S100 recites accessing a count of discover analysis instances for the engineering design project. Generally, in Block S160, the computer system can receive confirmation of the design specification for the engineering design project from the user; and generate a count (e.g., quantity) of discover analysis instances for the engineering design project.

Furthermore, Blocks S162, S164, and S166 of the method S100 recite, for each discover analysis instance in the count of discover analysis instances: defining a unique combination of discover values of input parameters within corresponding characteristic ranges of the set of input parameters; based on the virtual model, the set of composite functions, and the unique combination of discover values of input parameters, executing the discover analysis instance to calculate a set of discover values of the set of output characteristics; and rendering representations of the unique combination of discover values of input parameters and the set of discover values of the set of output characteristics within a user interface.

Figure 6:
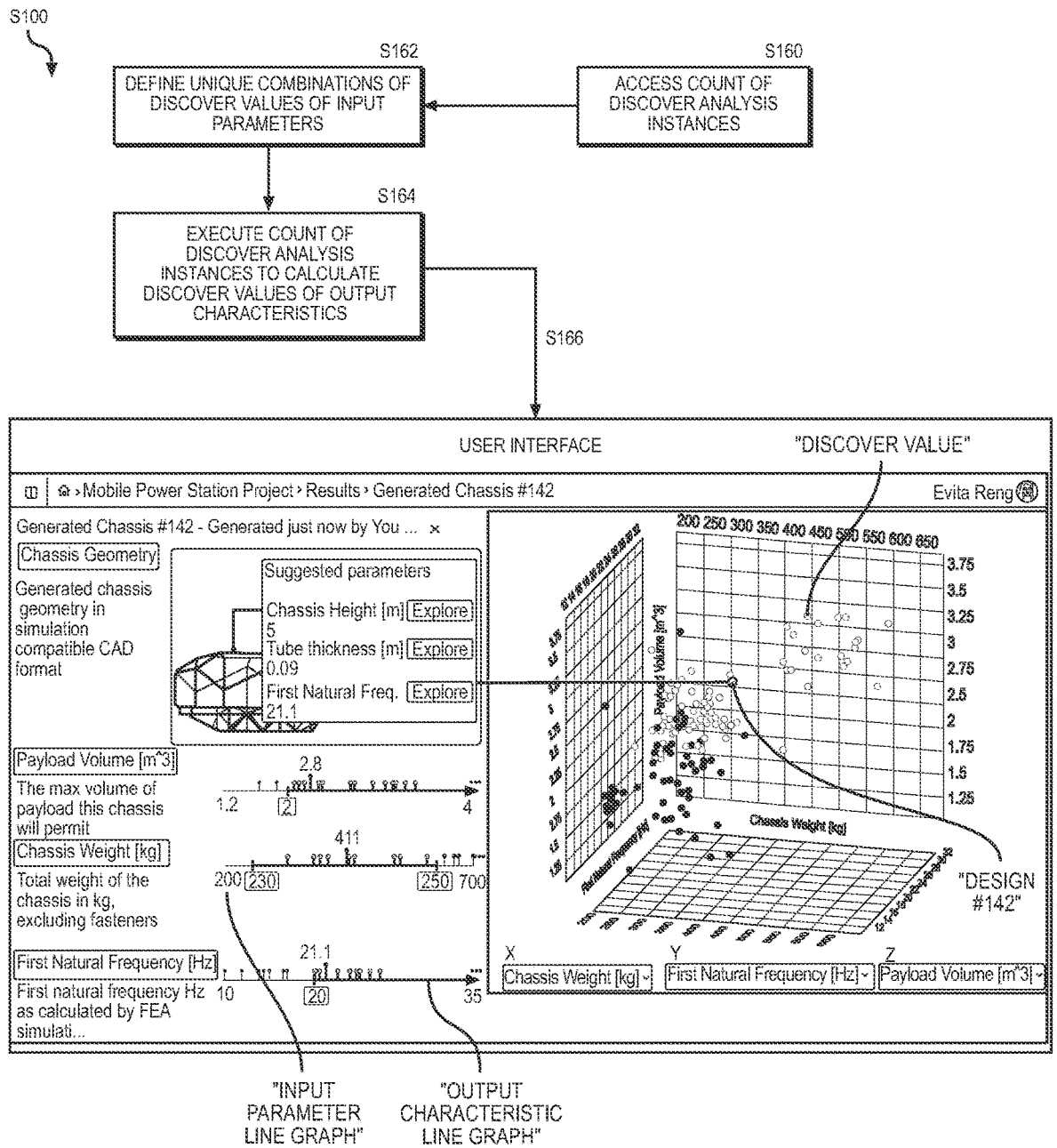
FIG. 6 is a flowchart representation of one variation of the method.

Generally, in the discovery phase, the computer system: accesses a count of discover analysis instances for the engineering design project; defines discover values of input parameters; executes the count of discover analysis instances to calculate discover values of output characteristics; and renders representations of these discover values of input parameters and output characteristics within the user interface, as shown in FIG. 6. In particular, the computer system can: generate a count of discover analysis instances for the engineering design project as a function of a preset count for the discovery phase (e.g., 100), a user-selected count for the discovery phase (e.g., 80), a resource limit defined by the user, and/or a resource allocation for each discover analysis instance.

More specifically, the computer system can: define a quantity of discover analysis instances (e.g., 100 discover analysis instances); define a unique combination of discover values of the set of input parameters for each discover analysis instance; execute each discover analysis instance to calculate discover values of the set of output characteristics; and render discover analysis results (e.g., representations of pairs of discover values of input parameters and output characteristics each discover analysis instance) within the user interface. Therefore, the computer system can populate the user interface with the discover analysis results corresponding to the count of discover analysis instances in order to enable a user to view results of all discover analysis instances within the user interface.

12.1 Discover Analysis Execution: Input Parameter Affects Virtual Model

In one implementation, the computer system implements methods and techniques described above: to query the language model for a first characteristic range of values of a first input parameter (e.g., a geometric variable) exhibited within historical engineering solutions correlated with the set of language signals; to query the language model for a second characteristic range of values of a second input parameter (e.g., a contextual variable), exhibited within historical engineering solutions correlated with the set of language signals; and to link the first input parameter to a first model variable in the virtual model.

The computer system then: generates a count of discover analysis instances for the engineering design project; defines a unique combination of discover values (e.g., a unique distribution of values) of the first input parameter—including a first discover value of the first input parameter within the first characteristic range of values and a second discover value of the second input parameter within the second characteristic range of values—for a first discover analysis instance in the count of discover analysis instances; and executes the first discover analysis instances to calculate a set of discover values of the second input parameter based on the virtual model, the set of composite functions, and the unique combination of discover values of the first input parameter. For example, the computer system can: generate a first model instance of the virtual model by modifying the first model variable in the virtual model according to the first discover value of the first input parameter; and, based on the first model instance, the first set of composite functions, and the second discover value of the second input parameter, execute the first discover analysis instance to calculate a first set of discover values of the set of output characteristics.

In one variation, the computer system: queries the language model for a first characteristic range of values of a first input parameter, such as a geometric variable (e.g., vane width of an impeller), exhibited within historical engineering solutions correlated with the set of language signals; queries the language model for a second characteristic range of values of a second input parameter, such as a characteristic scalar value (e.g., viscosity of oil), exhibited within historical engineering solutions correlated with the set of language signals; and links the first input parameter to a first model variable in the virtual model. The computer system then: generates a count of discover analysis instances for the engineering design project; and defines a unique combination of discover values (e.g., a unique distribution of values) of the geometric variable—including a first discover value of the geometric variable (e.g., 0.01 mm) within the first characteristic range of values and a second discover value of the characteristic scalar value (8 centistokes).

Therefore, the computer system can generate model instances by modifying the model variables in the virtual model according to the discover values of the input parameters and calculate corresponding discover values of output characteristics by executing the count of discover analysis instances.

12.1.1 Live Discover Value Generation: Particle Swarm

Generally, the computer system can implement artificial intelligence techniques (e.g., particle swarm techniques, genetic algorithms, gradient based optimization, Bayesian optimization, pattern search, Latin hypercube sampling) to inform unique combinations of discover values of input parameters within corresponding characteristic ranges for the discovery phase.

In one variation, the computer system: identifies a first output characteristic in the set of output characteristics based on the set of language signals; defines a target range of values of the first output characteristic based on an input entered by the user into the user interface; defines a first unique combination of discover values of input parameters within corresponding characteristic ranges of the set of input parameters; executes the first discover analysis instance to calculate a first discover value of the first output characteristic; and implements particle swarm techniques to inform a second unique combination of discover values of input parameters—different from the first unique combination of discover values—predicted to shift output characteristics of a second discover analysis instance toward—and then across—the target range of values of the first output characteristic. The computer system can repeat these methods and techniques for each other target range of values of output characteristics entered by the user and for each other discover analysis instance in the count of discover analysis instances.

In one implementation, the computer system defines a first target range of values of the first output characteristic based on an input entered by the user into the user interface. Then, for a first discover analysis instance in the first count of discover analysis instances, the computer system: defines a first unique combination of discover values of input parameters within corresponding characteristic ranges of the set of input parameters; and, based on the virtual model, the first set of composite functions, and the first unique combination of discover values of input parameters, executing the first discover analysis instance to calculate a first discover value of the first output characteristic. The computer system then characterizes a difference between the first discover value of the first output characteristic and the first target range of values of the first output characteristic.

For a second discover analysis instance in the count of discover analysis instances, the computer system: defines a second unique combination of discover values of input parameters within corresponding characteristic ranges of the set of input parameters and predicted to yield a second discover value of the second output characteristic differing from the first target range by less than the first difference; and, based on the virtual model, the second set of composite functions, and the second unique combination of discover values of input parameters, executes the second discover analysis instance to calculate the second discover value of the second output characteristic.

Therefore, the computer system can implement particle swarm techniques to calculate a single unique combination of discover values of input parameters for each discover analysis instance in order to drive discover values of output characteristics toward target ranges entered by the user.

12.1.2 Resource-Limited Analysis Count

In one variation, the computer system: receives a resource limit (e.g., a time limit, a cost limit, a token limit) from the user; estimates a resource allocation (e.g., a time duration, a cost amount, a quantity of tokens) for each discover analysis instance; and calculates the count of discover analysis instances based on the resource limit and the resource allocation, as shown in FIG. 1B.

For example the computer system can: receive a time limit for the discovery phase from the user via the user interface, such as ten minutes; estimate a resource allocation for each discovery analysis instance, such as 24 seconds per discover analysis instance; and calculate a count of discover analysis instances, such as 25, according to the time limit and the resource allocation. Therefore, the computer system can calculate the count of discover analysis instances as a function of user-defined resource limits (e.g., a time limit, a cost limit, a token limit).

12.1.2 Visualization Capture of Model Instances

In one variation, the computer system: generates a graphical representation (e.g., a visualization) of each model instance; and renders the graphical representation of each model instance and the set of discover values of the set of output characteristics within the user interface.

In one implementation, for each discover analysis instance, the computer system: generates a model instance by modifying a model variable in the virtual model according to a discover value of a corresponding input parameter; records a reference image of the model instance, such as from a reference perspective (e.g., a front upper left isometric perspective) or a set of reference perspectives; and renders the reference image of the model instance and the set of discover values of the set of output characteristics within the user interface.

In another implementation, for each discover analysis instance, the computer system records an animation (e.g., an FEA simulation video clip) demonstrating behavior of the corresponding model instance (e.g., modified virtual model) under conditions tested in the discover analysis instance. For example, the computer system can: record a stress animation, a deformation animation, a modal analysis animation, a thermal analysis animation, or a computational fluid dynamics simulation animation demonstrating behavior of the corresponding model instance. The computer system then renders the animation and the set of discover values of the set of output characteristics within the user interface.

In yet another implementation, for each discover analysis instance, the computer system records a thumbnail or three-dimensional image (e.g., a light-weight three-dimensional image) of the corresponding model instance (e.g., modified parametrized computer-aided design model); and renders the thumbnail or three-dimensional image of the model instance and the set of discover values of the set of output characteristics within the user interface.

Therefore, the computer system can generate a graphical representation (e.g., a visualization) of each model instance, present these visualizations within the user interface, and thereby, enable the user to view all model instances as graphical representations (e.g., a reference image, a three-dimensional image, a thumbnail, an animation).

12.2 Discover Analysis Results

Generally, the computer system can render results from the count of discover analysis instances from the discovery phase in the user interface. In particular, the computer system can: render a two-dimensional table including input parameters, output characteristics, discover values of input parameters, discover values of output characteristics, and visualizations of the count of discover analysis instances; render a three-dimensional plot depicting groups of discover values of input parameters and output characteristics; and/or render a set of one-dimensional line graphs representing the set of input parameters and the set of output characteristics within the user interface.

12.2.1 Two-Dimensional Table

In one implementation, the computer system: renders a two-dimensional table; and populates the two-dimensional table with a set of columns including a list of input parameters and output characteristics, input parameter values input into each discover analysis instance, and output characteristic values resulting from each discover analysis instance.

Figure 2:
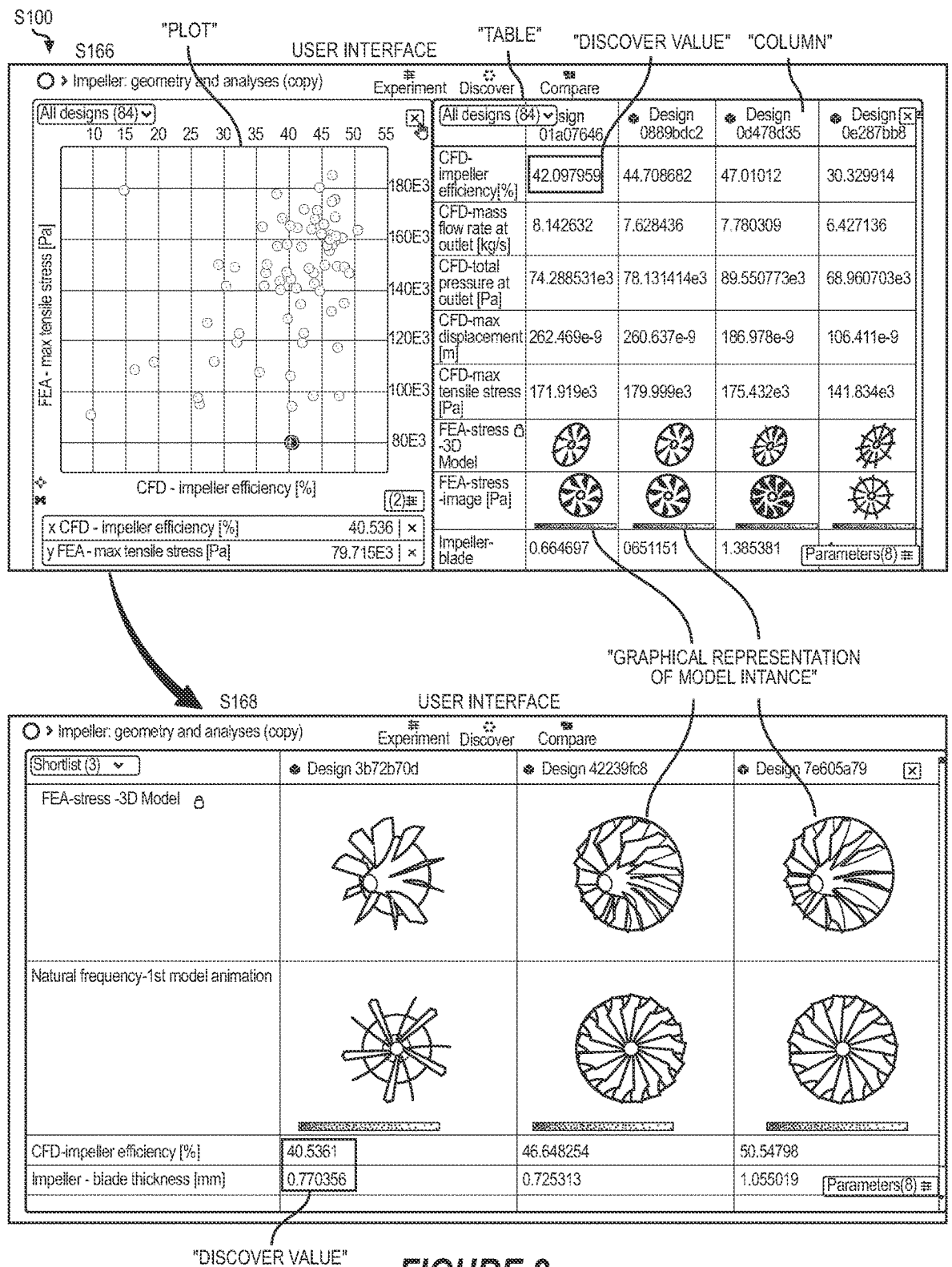
FIG. 2 is a flowchart representation of one variation of the method.

For example, the computer system can: render a two-dimensional table within the user interface; and populate the two-dimensional table with a first column including a list of input parameters and output characteristics associated with the engineering design project. The computer system can then populate the two-dimensional table with a second column including: a set of input parameter values input into a first discover analysis instance; a set of output characteristic values resulting from the first discover analysis instance; and a visualization(s) of the first discover analysis instance (e.g., a reference image, a thumbnail, a simulation, an animation, or a three-dimensional image). The computer system can populate the two-dimensional table with a third column including: a set of input parameter values input into a second discover analysis instance; a set of output characteristic values resulting from the second discover analysis instance; and a visualization(s) of the second discover analysis instance (e.g., a reference image, a thumbnail, a simulation, an animation, or a three-dimensional image), as shown in FIG. 2.

The computer system can repeat these methods and techniques for each other analysis instance to populate the two-dimensional table with columns of input parameter values and output characteristic values of all discover analysis instances.

Therefore, the computer system can render a two-dimensional table within the user interface to enable the user to view results of all discover analysis instances from the discovery phase in one pane (e.g., a two-dimensional table).

12.2.2 One-Dimensional Line Graphs

Figure 4:
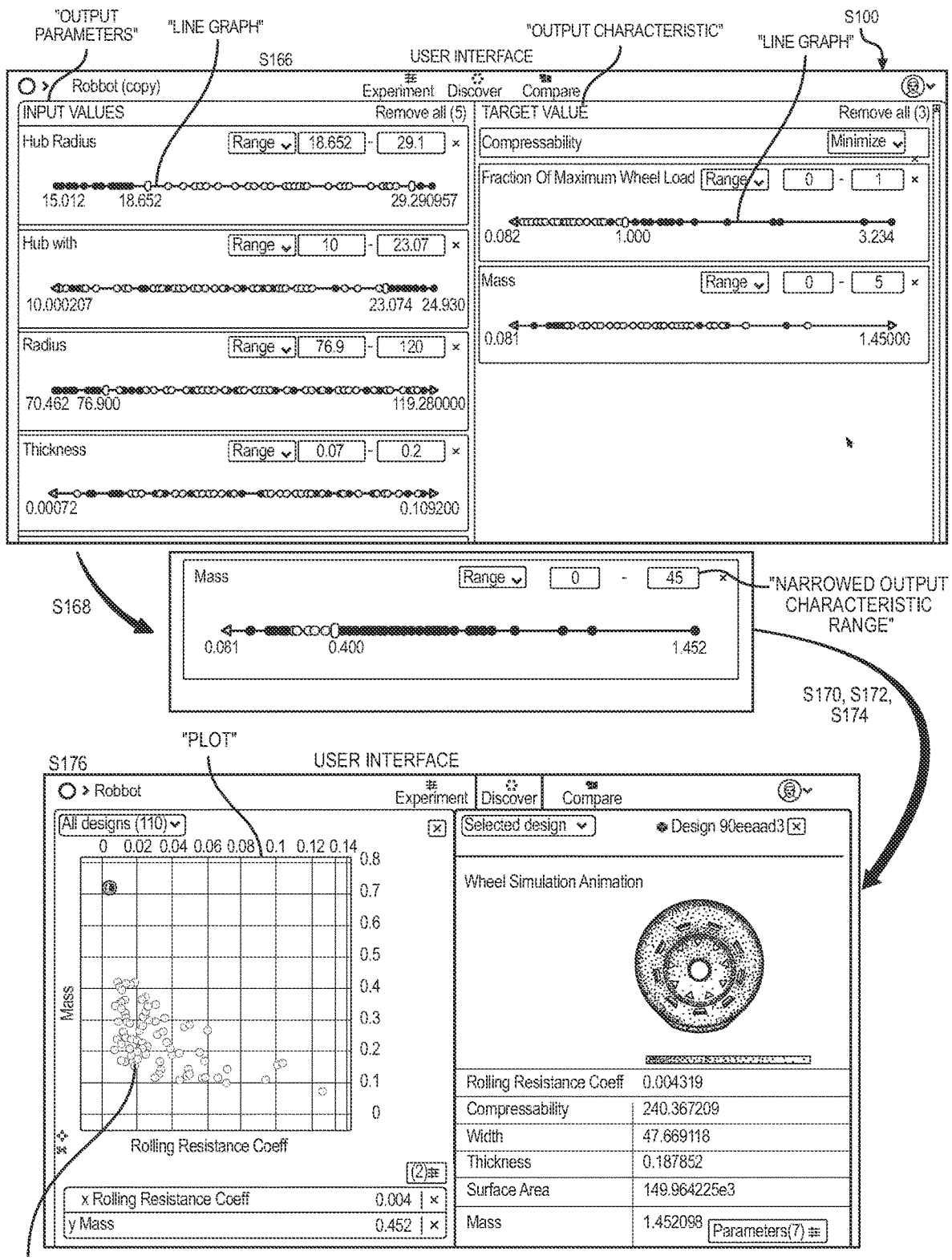
FIG. 4 is a flowchart representation of one variation of the method.

In one implementation, the computer system generates a line graph for each input parameter and populates the line graph with a marker of each input parameter value applied across each discovery analysis instance in the discovery phase. The computer system further generates a line graph for each output characteristic and populates the line graph with a marker of each output characteristic value resulting from each discover analysis instance in the discovery phase. The computer system then renders these line graphs in the user interface, as shown in FIG. 4.

In one variation, the computer system: generates a one-dimensional line graph for each input parameter; and populates the one-dimensional line graph with a marker (e.g., a point, a dot) of each input parameter value applied across each discover analysis instance in the discovery phase for each input parameter. Then, for each output characteristic, the computer system: generates a one-dimensional line graph; populates the one-dimensional line graph with a marker (e.g., a point, a dot) of each output characteristic value resulting from each discover analysis instance in the discovery phase; highlights (or otherwise distinguishes) markers that correspond to output characteristic values that fall within corresponding output characteristic ranges previously selected or confirmed by the user from output characteristic values that fall outside of these output characteristic ranges; and renders these one-dimensional line graphs of input parameters and output characteristics in the user interface.

Therefore, the computer system can render a set of one-dimensional line graphs corresponding to input parameters and output characteristics within the user interface to enable the user to view results of all discover analysis instances from the discovery phase in a graphical visualization.

12.2.2 Multi-Dimensional Plots

Additionally or alternatively, the computer system can: recommend a combination of a subset of (e.g., two or three) input parameters and output characteristics; and initialize a three-dimensional plot of these input parameters and output characteristics. Then, for each discover analysis instance, the computer system can: retrieve values of these selected input parameters from the discover analysis instance; retrieve output characteristic values of these selected output characteristics from the output characteristic value set of the discover analysis instance; and plot a combination of input parameter values and output characteristic values in the three-dimensional plot. The computer system can then render the three-dimensional plot in the user interface.

In one implementation, the computer system can: receive selection of a first input parameter and a second input parameter, in the set of input parameters, from the user via the user interface; receive selection of an output characteristic, in the set of output characteristics, from the user via the user interface; and render a first three-dimensional plot depicting groups of values of the first input parameter, the second input parameter, and the first output characteristic corresponding to each discover analysis instance in the count of discover analysis instances.

For example, the computer system can: receive selection of a first input parameter, such as total pressure at the outlet of an impeller, and a second input parameter, such as vane angle, from the user via the user interface; receive selection of an output characteristic, such as impeller efficiency, from the user via the user interface; initialize a three-dimensional plot of the total pressure, the vane angle, and impeller efficiency; extract discover values of total pressure, vane angle, and impeller efficiency for each discover analysis instance in the count of discover analysis instances; populate the three-dimensional plot with these discover values; and render the three-dimensional plot within the user interface, as shown in FIG. 1B.

12.3 Data Investigation Guidance

In one implementation, the computer system: calculates strengths of correlations between each input parameter in the set of input parameters and each output characteristic in the set of output characteristics; and prompts investigations, range refinement, or three-dimensional plot construction based on input parameters exhibiting a strongest correlation to highest-priority output characteristics, such as manually set by the user or interpreted by the computer system from previous user queries during the engineering design project.

In one variation, the computer system can: receive selection of an output characteristic from the user; identify the output characteristic as a primary output characteristic of interest to the user based on the set of language signals extracted from the user input; and derive a set of correlations between the primary output characteristic and each input parameter in the set of input parameters. Responsive to a correlation between the primary output characteristic and a first input parameter and a second correlation between the primary output characteristic and the second input parameter exceeding a threshold correlation, the computer system can: generate a prompt to investigate the primary output characteristic relative to the first input parameter and the second input parameter; and serve the prompt to the user via the user interface. The computer system can then receive selection of the first input parameter and the second input parameter from the user responsive to the prompt.

For example, the computer system can: select a subset of (e.g., two) input parameters, such as total pressure at the outlet of an impeller and vane count, that exhibit strongest correlations to a primary output characteristic of interest to the user, such as impeller efficiency; generate a prompt to investigate impeller efficiency relative to the total pressure at the outlet and vane count; and serve the prompt to the user via the user interface. The computer system can then receive selection of the total pressure at the outlet and vane count from the user responsive to the prompt and implement methods and techniques described above to generate a three-dimensional plot based on total pressure at the outlet, vane count, and impeller efficiency.

Alternatively, the computer system can automatically highlight input parameters and/or output characteristics that exhibit strongest (e.g., direct or inverse) correlations within the three-dimensional plot rather than prompting the user to investigate an output characteristic relative to a subset of input parameters.

12. Explore Phase

Generally, the computer system: prompts the user to refine (e.g., narrow, expand) ranges of values of input parameters and/or output characteristics; accesses a count of explore analysis instances for the engineering design project in Block S170; and implements methods and techniques described above to render representations of explore values of input parameters and output characteristics within the user interface.

In particular, the computer system can implement artificial intelligence techniques (e.g., particle swarm techniques, genetic algorithms, gradient based optimization, Bayesian optimization, pattern search, Latin hypercube sampling) to inform unique combinations of explore values of input parameters within corresponding target ranges for the explore phase.

In one implementation, the computer system: prompts the user to refine ranges of input parameters and/or output characteristics via the user interface responsive to execution of the count of discover analysis instances; defines a target range of values of an input parameter narrowed from a first characteristic range of values by the user; and accesses a count of explore analysis instances for the engineering design project. For example, the computer system can calculate a count of explore analysis instances greater than the count of discover analysis instances or less than the discover analysis instance according to a resource limit selected by the user.

Then, for each explore analysis instance in the count of explore analysis instances, the computer system: defines a unique combination of explore values of input parameters comprising an explore value of the input parameter within the target range of values of the input parameter in Block S172; based on the virtual model, the set of composite functions, and the unique combination of explore values of input parameters, executes the explore analysis instance to calculate a set of explore values of the set of output characteristics in Block S174; and renders representations of the unique combination of explore values of input parameters and the set of explore values of the set of output characteristics within the user interface in Block S176.

13.1 Narrow Limit Bars+Particle Swarm

In one variation, the computer system: renders one-dimensional line graphs populated with input parameter values from the count of discover analysis instances executed during the discovery phase; renders markers (e.g., limit bars) on these one-dimensional line graphs; prompts the user to adjust (i.e., narrow) limit bars for one (or more) input parameter; implements the methods and techniques described above to generate a count of explore analysis instances; defines a unique combination of explore values of input parameters; executes the count of explore analysis instances to calculate a set of explore values of the set of output characteristics; and renders representations of explore values of input parameters and output characteristics within the user interface.

In another variation, the computer system can: render one-dimensional line graphs populated with output characteristic values from the discover analysis instances executed during the discovery phase; render markers (e.g., limit bars) on these one-dimensional line graphs; and prompt the user to adjust (i.e., narrow) limit bars for one (or more) output characteristic.

The computer system can then implement methods and techniques described above to: define unique combinations of explore values of input parameters within corresponding characteristic ranges of the set of input parameters; execute each explore analysis instance to calculate explore values of the set of output characteristics; and implement particle swarm techniques to inform a next unique combination of explore values of input parameters—different from the first unique combination of explore values of input parameters—predicted to shift output characteristics of a second explore analysis instance toward—and then across—the target range of values of the output characteristic selected by the user, as shown in FIG. 4.

13.2 Cluster of Points Selection

Generally, the computer system can: receive selections of various filters, thresholds, output characteristic ranges, and/or bounding boxes entered by the user via the user interface; and execute the count of explore analysis instances to explore other possible design solutions for the engineering design project.

More specifically, in response to receiving selection of a output characteristic range at the user interface, the computer system can implement regression, machine learning, and/or other techniques to automatically generate a quantity of explore analysis instances for the part including values within ranges of input parameters bounded by the output characteristic range. The computer system can then: execute the count of explore analysis instances to calculate explore values of the set of output characteristics; and populate the visualization with representations of values and values of each explorer analysis instance. The computer system can present this visualization to the user within the user interface, thereby enabling the user to gain further insight into possible analysis instances for the engineering design project within a focused region-of-interest within the visualization.

In one variation, the computer system: renders a three-dimensional plot depicting results of three input parameters and/or output characteristics across discover analysis instances during the discovery phase; prompts the user to select a cluster of points within the three-dimensional plot; and automatically updates (i.e., narrows) ranges of corresponding input parameters and output characteristics. The computer system then implements methods and techniques described above to generate and execute the count of explore analysis instances within explore values of input parameters and output characteristics within these narrowed ranges.

For example, the computer system can: prompt the user to isolate a three-dimensional region of interest, within the first three-dimensional plot, containing a subset of groups of values of a first input parameter, a second input parameter, and an output characteristic corresponding to discover analysis instances in the count of discover analysis instances; define a first target range of values of the first input parameter, narrower than the first characteristic range of values, bounded by the three-dimensional region of interest within the first three-dimensional plot; define a second target range of values of the second input parameter, narrower than the second characteristic range of values, bounded by the three-dimensional region of interest within the first three-dimensional plot; and access a count of explore analysis instances for the engineering design project.

Then, for each explore analysis instance in the count of explore analysis instances, the computer system can: define a unique combination of explore values of input parameters including a first explore value of the first input parameter within the first target range of values of the first input parameter and a second explore value of the second input parameter within the second target range of values of the second input parameter; based on the virtual model, the set of composite functions, and the unique combination of explore values of input parameters, execute the explore analysis instance to calculate a set of explore values of the set of output characteristics; and render a second three-dimensional plot depicting groups of values of the first input parameter, the second input parameter, and the output characteristic corresponding to each explore analysis instance in the count of explore analysis instances, as shown in FIG. 1C.

Therefore, the computer system can: return immediate and meaningful design solutions (e.g., explore analysis instances paired with explore analysis results) for targeted research and development of the engineering design project given selection of a cluster of points within the three-dimensional plot and narrowed ranges of corresponding input parameters and output characteristics.

14. Variation: Language Model Defined Ranges

In one variation, the computer system can implement methods and techniques described above: to select a set of functions from the function library; to extract a set of geometric input parameters from the set of functions; to extract a set of dimensional input parameters from the set of functions; to extract a set of geometric output characteristics from the set of functions; to access one (or multiple) resource database(s); and to scan this resource database for scientific data associated with the part and the design context linked to each function. The computer system can then: access a virtual model of the part; extract a set of model variables from the virtual model; and define a range of values of each input parameter, mapped to a corresponding model variable.

For example, the computer system can: access a computer-aided design model of an impeller; extract a set of model variables, such as a base diameter, an angle of attack, a size, and a weight of the impeller, from the computer-aided design model; interpret an output characteristic, such as mass flow rate of water, from the computer-aided design model; select an impeller fluid dynamics function from the function library; extract a set of variable input parameters, such as quantity of blades and base diameter of the impeller, from the impeller fluid dynamics function; extract an output characteristic (e.g., mass flow rate of water), in a set of output characteristics, from the fluid dynamics function; and access a corpus of impeller fluid dynamics data. Based on the corpus of impeller fluid dynamics data, the computer system can: define a range of values, such as between 9 inches and 15 inches, of a first input parameter (e.g., base diameter), mapped to a corresponding model variables; and define a range of values, such as between 600 gallons-per-minute and 1300 gallons-per-minute, of a first output characteristic (e.g., mass flow rate), mapped to the target mass flow rate, in the target set of output characteristics, of the impeller.

15. Variation: Model-Derived Input Parameters+Output Characteristics

Generally, the computer system interfaces receives—from the user via the user interface rendered on a user device—a virtual model of a part defining geometry, such as a set of dimensions and/or material properties of the part and receives an analytical function (e.g., a finite element analysis model, a mathematical simulation, a complex simulation, a numerical model) configured to calculate output values of the set of output characteristics for possible discover analysis instances. The computer system can then: extract a set of input parameters, defined by the user, from the virtual model of the part; extract a set of output characteristics from the virtual model and the analytical function; and generate a visualization (e.g., an n-dimensional design space) representing ranges of possible values of these input parameters and output characteristics. The computer system can further: implement regression, machine learning, and/or other techniques to generate a count of discover analysis instances, including input values within ranges of the set of input parameters represented in the visualization; populate the user interface with the visualization; feed the virtual model of the part and the set of input values of each discover analysis instance into the analytical function and execute the analytical function to calculate a set of output values of the set of output characteristics; and update the visualization with these input values and output values of each discover analysis instance.

More specifically, the computer system can receive a virtual model of the part and presents a module database including a set of predefined modules associated with a design solution domain (e.g., aerospace, structural mechanics, thermomechanics, automotive, micromobility) and including predefined analytical functions corresponding to the design solution domain. The user may then select a module from the module database including an analytical function corresponding to a design solution domain of interest to the user. Responsive to selection of the analytical function, the computer system extracts input parameters and output characteristics from the virtual model and the analytical function. The computer system then: prompts the user to define a range of possible values for each input parameter; defines the visualization with these ranges of possible values; pseudo-randomly selects input values represented in the visualization to generate a count of discover analysis instances for the part; executes the analytical function to calculate corresponding output values of output characteristics for each discover analysis instance; and populates the visualization with representations of input values and output values of each discover analysis instance.

Accordingly, the computer system can present this visualization—containing discover analysis results for the workpiece—that fulfill the user's design requirements, within the user interface for the user to review.

Additionally, in response to selection of a region-of-interest, a bounding box, or a filter (e.g., minimize cost, maximize strength) by the user within the user interface, the computer system can highlight a subset of discover analysis results within this region-of-interest and present this highlighted region-of-interest in the visualization within the user interface.

15.1 Virtual Model of Part+Input Parameters

Generally, the computer system receives a virtual model of the part and an analytical function from the user via the user interface, extract input parameters and output characteristics from the virtual model and the analytical function, and receive selection of various input value ranges, filters, and/or thresholds—such as an upper boundary and/or a lower boundary—for each input parameter.

More specifically, the computer system can access a virtual model—such as a computer-aided design model—of the part defining a geometry, such as a set of dimensions and/or material properties of the part. The computer system can then extract a set of input parameters and a set of output characteristics from the virtual model of the part. The user may then define a possible range of real values for each input parameter (e.g., an approximate range of values, a best-guess range of values) to guide the computer system to generate discover analysis instances for the part including output values of output characteristics within these ranges of possible values corresponding to manufacturing requirements.

In one variation, the computer system can extract a set of features of the part for parameterization and geometry of the part from the virtual model and present these features to the user via the user interface. Then, responsive to selection of a set of features for parameterization by the user, the computer system can identify the set of features as a set of input parameters.

For example, the computer system can access a virtual three-dimensional model of the van panel defining geometry. The geometry of the van panel can include a total width of 127.215 millimeters, a first radius of curvature of 1001.474 millimeters, and a second radius of curvature of 446.947 millimeters. The computer system can then derive a set of features of the part for parameterization such as pocket depth, pocket width, pocket rotation angle, and/or draft angle, from the geometry of the van panel. Responsive to selection of pocket depth, pocket width, pocket rotation angle, and draft angle as the set of features for parameterization by the user, the computer system can identify this set of features as a set of model variables.

In another variation, the computer system can receive selections of various filters and/or thresholds—such as a minimum value and/or a maximum value—for each input parameter from the user via the user interface. In one example, the user may define a threshold stiffness, such as a minimum stiffness input value of 0.17. In another example, the user may enter a stiffness width range between 25 millimeters and 30 millimeters to explore possible discover analysis instances for a van panel with input values within this stiffness width range. Thus, the computer system can implement methods and techniques described below to: generate a set of discover analysis results for the van panel exhibiting a stiffness width within the stiffness width range; and, thereby, enable the user to discover analysis results for the van panel that accommodate a range of wheelbases for a van.

15.2 Analytical Functions+Output Characteristics

Once the computer system extracts the set of input parameters for the part, the computer system can access an analytical function defined by the user or selected from a module database to extract output characteristics for the part.

In one implementation, the computer system can: access a database of modules, each module associated with a particular design solution domain (e.g., aerospace, structural mechanics, thermomechanics, automotive, micromobility); select a module from the database associated with a design solution domain corresponding to an output characteristic; and extract a set of output characteristics from the virtual model and the analytical function.

In one variation, the computer system can: access a database of modules, each module defining an analytical function—such as a mathematical simulation, a numerical model, and/or a complex simulation (e.g., a finite element method simulation, a finite volume body fitted simulation, a computational fluid dynamics simulation)—associated with a particular design solution domain; select a module from the database of modules responsive to correspondence between an output characteristic and the design solution domain of the module; and extract a set of output characteristics from the virtual model and the analytical function.

In this example, similar to the foregoing example, the computer system can: receive a virtual model of a glider wing and a set of output characteristics entered by the user; extract a set of input parameters from the virtual model of the glider wing; access a database of modules including a set of predefined modules associated with a particular design solution domain and including a predefined analytical function; select an aerospace module from the database of modules based on correspondence between an input parameter of an angle of attack and the aerospace design solution domain of the module; and extract a set of output characteristics for the glider wing, such as an airfoil pitching moment coefficient, an airfoil drag coefficient, an airfoil lift-to-drag ratio, an airfoil lift coefficient, cost, and manufacturability.

15.2.1 User Defined Module

In one variation, the user may upload a custom module by defining a mesh type, a set of boundary conditions, a simulation type, input parameters for the simulation (e.g., air density, temperature), and a set of rules for mapping the set of boundary conditions onto the virtual model of the part. The computer system can then: receive a virtual model of the part and the custom module; extract a set of input parameters and a set of output characteristics from the virtual model and the custom module; generate a quantity of design solutions for the part including input values for the set of input parameters; and feed these input values into the simulation, defined in the module, to calculate output values for each discover analysis instance.

For example, to define a fluid dynamics module, the user may define: a hex mesh type; an impeller computational fluid dynamics simulation configured to calculate output values for an output characteristic, such as mass flow rate; a set of input parameters, such as a null pressure at an inlet of the impeller, a null pressure at the outlet of the impeller, and a rotational velocity of 500 radians-per-second; a material type of air for the impeller; and a set of rules for mapping the set of boundary conditions onto the virtual model of the impeller.

The computer system can then: access a virtual model of the impeller and the custom module; extract a set of input parameters—such as a null pressure at an inlet of the impeller, a null pressure at the outlet of the impeller, and a rotational velocity of 200 radians-per-second from the virtual model of the impeller—and an output characteristic, such as mass flow rate of air, from the virtual model and the fluid dynamics module; implement regression techniques and/or other machine learning techniques to generate a quantity of design solutions for the impeller including input values for the set of input parameters; and feed these input values into the computational fluid dynamics simulation, defined in the custom module, and execute the computational fluid dynamics simulation to calculate output values of the mass flowrate of air for each discover analysis instance for the impeller.

The computer system can then generate a visualization that represents possible combinations of discrete input values within bounded ranges of possible values for each input parameter defined by the user for the impeller and render this visualization within the user interface, as further described below.

Additionally, the computer system stores this computational fluid dynamics simulation in a module database as a template for future virtual models of parts with similar output characteristics. For example, the computer system can: access a virtual model of a new impeller; retrieve the computational fluid dynamics simulation from the module database; and extract a set of input parameters—such as a null pressure at an inlet of the impeller, a null pressure at the outlet of the impeller, and a rotational velocity of 200 radians-per-second from the virtual model of the impeller—and an output characteristic of mass flow rate of water from the virtual model and the fluid dynamics module. The computer system can implement methods and techniques described above to generate discover analysis instances for this new impeller and execute the computational fluid dynamics simulation to calculate output values of the mass flow rate of water for each discover analysis instance for the impeller.

15.3 N-Dimensional Plot

Generally, the computer system defines a n-dimensional plot that represents ranges of possible values of the set of input parameters and the set of output characteristics. In particular, the computer system can assign each output characteristic and each input parameter to a domain or an axis to define an n-dimensional space of possible values (e.g., real values, non-numeric values).

In one implementation, the computer system can bound the n-dimensional plot based on ranges of real input values for each input parameter and ranges of real output values for each output characteristic, defined by the user, to ensure all possible design solutions of the part conform to the geometry and these ranges of real values entered by the user.

In one variation, the computer system defines the n-dimensional plot by: constraining a first axis of the n-dimensional plot, corresponding to a first input parameter, in the set of input parameters, within a first input parameter range defined by the user; constraining a second axis of the n-dimensional plot, corresponding to a second input parameter, in the set of input parameters, within a second input parameter range defined by the user; and constraining a third axis of the n-dimensional plot, corresponding to a first output characteristic, in the set of output characteristics, within an output characteristic range defined by the user. Thus, the computer system can generate a n-dimensional plot with a cubical volume.

The computer system repeats these methods and techniques for each other input parameter, for each other output characteristic, for each other range of input values, and for each other range of output values to define a n-dimensional design space and render a n-dimensional plot within the user interface. However, the computer system can define the n-dimensional plot in any other way and can define any other multi-dimensional volume.

For example, the computer system can generate a three-dimensional plot for a van panel by: constraining an first axis (e.g., an X-axis) of the three-dimensional plot, corresponding to a first input parameter, such as a stiffener depth, within a stiffener depth value range between 0 millimeters and 150 millimeters; constraining a second axis (e.g., a Y-axis) of the three-dimensional plot corresponding to a second input parameter, such as a stiffener base width, within a stiffener base width value range between 0 millimeters and 150 millimeters; and constraining a third axis (e.g., a Z-axis) of the three-dimensional plot corresponding to an output characteristic, such as stiffness of the van panel, within a stiffness value range between 0 and 0.3 millimeters. The computer system can then render the three-dimensional plot within the user interface.

In another variation, the computer system can automatically define an input value range for each input parameter and an output value range for each output characteristic within a predefined tolerance range (e.g., a tolerance range of +/−50%, a tolerance range of +/−25%). For example, the computer system can extract an input value of an input parameter, such as 50 millimeters of a stiffener depth for a van panel and define an input value range for this input parameter, such as a stiffener depth value range between 25 millimeters and 75 millimeters. Alternatively, the computer system can prompt the user to select a "best-guess" input value range for each input parameter and output value range for each output characteristic. The computer system can then define an input value range for each input parameter and an output value range for each output characteristic within a tolerance range of +/−50% of the user's "best-guess" value ranges.

Alternatively, the computer system can define a multi-dimensional set of values that represents ranges of possible non-numeric values of the set of input parameters and the set of output characteristics. The computer system can then bound the multi-dimensional set of values based on ranges of non-numeric input values for each input parameter and ranges of output values for each output characteristic, defined by the user, to ensure all possible design solutions of the part conform to the geometry and these non-numeric ranges of values entered by the user.

15.4 Discover Analysis Instances

Generally, the computer system can generate a count of discover analysis instances, each discover analysis instance, in the first quantity of design solutions, including a first set of input values within ranges of the set of input parameters represented in the visualization.

In one implementation, the computer system can pseudo-randomly select input values represented in the visualization to generate the count of discover analysis instances for the part, execute the analytical function to calculate output values of the set of output characteristics for each discover analysis instance, and populate the virtual representation of the multi-dimensional design space with representations of input values and output values of each discover analysis instance.

For example, the computer system can: access a virtual model of an impeller and a fluid dynamics simulation; extract a set of input parameters—such as a null pressure at an inlet of the impeller, a null pressure at the outlet of the impeller, and a rotational velocity of 200 radians-per-second from the virtual model of the impeller—and an output characteristic, such as mass flow rate of air, from the virtual model and the fluid dynamics simulation; generate a quantity of design solutions for the impeller including input values for the set of input parameters; feed the virtual model of the impeller and these input values of each discover analysis instance into the fluid dynamics simulation; execute the fluid dynamics simulation to calculate output values of the mass flowrate of air for each discover analysis instance for the impeller. The computer system can then populate the visualization with input values and output values of each discover analysis instance for the impeller.

Additionally or alternatively, the computer system can pseudo-randomly select input values represented in the visualization as a function of time, cost, quantity of simulations via the analytical function, and/or comprehensiveness to generate the count of discover analysis instances for the part.

In one variation, the computer system can pseudo-randomly select input values represented in the visualization as a function of a predefined aggregate compute duration (e.g., five minutes, 30 minutes, one hour) and generate a count of discover analysis instances for the part within this predefined aggregate compute duration.

In another variation, the computer system can pseudo-randomly select input values represented in the visualization as a function of a predefined aggregate compute cost threshold (e.g., five dollars, six dollars, fifteen dollars) and generate a count of discover analysis instances for the part proportional to the compute cost. For example, the computer system can feed these input values into the analytical function and execute the analytical function to calculate output values of each discover analysis instance. The computer system can then: track the compute cost of each simulation executed by the analytical function during a particular time period (e.g., ten minutes); detect an aggregate compute cost, such as six dollars; and, in response to the aggregate compute cost exceeding the threshold aggregate compute cost, terminate execution of further simulations by the analytical function and populate the visualization with input values and output values of the discover analysis instances generated during this particular time period.

In yet another variation, the computer system can: pseudo-randomly select input values represented in the visualization to generate the count of discover analysis instances for the part and execute the analytical function according to a predefined quantity of simulations (e.g., five, ten, twenty) to calculate output values of the set of output characteristics for each discover analysis instance.

Thus, the computer system can: present a visualization containing possible discover analysis instances for the part, that fulfill the user's design and computational compute requirements, within the user interface; and, thereby, enable the user to review and further refine the set of input parameters to achieve output characteristics for possible explore analysis instances, as further described below.

15.5 Region-of-Interest: Focused Design Solutions

In one implementation, after the computer system presents the count of discover analysis instances to the user, the computer system can receive selection of a region-of-interest or a bounding box within the visualization and a target characteristic range at the user interface. The computer system can then scan the previously generated design solution set for design solutions of the glider wing exhibiting an output characteristic that falls within this target characteristic range. The computer system can further highlight a subset of design solutions that exhibit this output characteristic within the target characteristic range and present the highlighted visualization within the user interface.

Additionally, the computer system can return a list of the subset of design solutions that exhibit this output characteristic within the target characteristic range and render the list of the subset of design solutions to the user interface for the user to review. Alternatively, the computer system can return a list of a subset of design solutions that fail to exhibit this output characteristic within the target characteristic range and render the list of this subset of design solutions to the user interface for the user.

In one variation, the user selects a region-of-interest within the visualization in order to review possible design solutions contained in this region-of-interest. The computer system can then further highlight a subset of design solutions within this region-of-interest and render the highlighted visualization within the user interface. For example, the user enters a bounding box, such as a 6,912-pixel by 6,912-pixel region of a two-dimensional pixel grid, and then the computer system can apply these coordinates to the visualization. The computer system can further: assign a color value to this boundary; highlight a subset of design solutions within this boundary by displaying this subset of design solutions with the color value; and render the highlighted visualization within the user interface, thus enabling the user to review this focused subset of design solutions of the glider wing.

In another variation, the computer system can display a slider corresponding to each output characteristic, entered by the user, in addition to the visualization within the user interface. The user can then adjust the slider to select a target characteristic range at the user interface to filter the design solution set to a subset of design solutions exclusively exhibiting the output characteristic within this target characteristic range.

In one example, the user reviews a design solution set for a glider wing in the user interface and enters a target characteristic range for an airfoil drag coefficient in order to filter the design solution set to a subset of design solutions exhibiting an airfoil drag coefficient within the target characteristic range. In this example, the user adjusts a selectable slider to select a target airfoil drag coefficient range between 0.000 and 0.009. Then, in response to selection of the target airfoil drag coefficient range between 0.000 and 0.009, the computer system: assigns a color value to this target airfoil drag coefficient range; identifies a subset of design solutions for the glider wing, within the visualization, exhibiting an airfoil drag coefficient falling within the target airfoil drag coefficient range between 0.000 and 0.009; and projects the color value onto each discover analysis instance in the subset of design solutions for the glider wing to highlight the subset of design solutions within the visualization.

The computer system then renders the highlighted visualization within the user interface and, thereby, enables the user to review a focused subset of design solutions of the glider wing exhibiting an airfoil drag coefficient between 0.000 and 0.009 within the user interface, to selectively adjust the ranges of input parameter values and output characteristic values, and to update the design specification for the glider wing.

15.6 Geometry Viewer: Visual Representation of Part

In one variation, the user may review the visualization and select a particular point representing a discover analysis instance. The computer system can then automatically update the virtual model of the part and present a visual representation of the geometry and output characteristics of the part exhibited by this particular design solution, such as a graphical image or a video of the flow field over the part.

Further, the computer system can implement methods and techniques described above to present the visualization to the user and represent a set of (e.g., three) axes—each axis including input values of an input parameter or output values of an output characteristic of the part—as sliders within the user interface. The user may then interact with a slider to select a value of interest to the user and the computer system can automatically update the visualization to present the value as a particular point within the visualization within the user interface.

For example, the user may select a particular point within the visualization representing a discover analysis instance for an impeller, such as geometric representation of the virtual model of the impeller occupying a particular position and corresponding to values of a particular axis in the visualization. The computer system can then: extract the input values from this particular point; access the virtual model of the impeller; feed these input values into the virtual model of the impeller, such as a computer aided design model of the impeller, to generate a new virtual model of the impeller characterized by these input values corresponding to the particular discover analysis instance of the impeller; and present this new virtual model of the impeller to the user via the user interface. Alternatively, the computer system can capture a graphical image of this new virtual model representing the geometry of the impeller and render and display this graphical image of the new virtual model within the user interface.

Additionally, in response to selection of a particular point in the visualization, the computer system can display an interactive visual representation of the part, such as a new virtual model of the part characterized by the input values of the particular point, within the user interface. Then, in response to receiving selection of a three-dimensional point within the new virtual model by the user, the computer system can implement artificial intelligence, machine learning, and/or other techniques to automatically suggest a set of input parameters to visualize within the visualization as a visual representation of the geometry of the part within the user interface.

However, the computer system can present a new virtual model or a graphical image of a part to a user in any other way and suggest input parameters of the part for the user to review within the visualization in any other way.

15.7 Single Target Characteristic Range+Multi-Parameter Exploration

In one implementation, the computer system can: receive selection of a target characteristic range at the user interface; and, in response to receiving selection of the target characteristic range, automatically generate a new quantity of explore analysis instances representing three-dimensional representations of the part (e.g., a real-world geometrical representation of the part) including values within ranges of input parameters bounded with the target characteristic range. The computer system can further: implement methods and techniques described above to execute the analytical function to calculate values of output characteristics corresponding to the values of the quantity of explore analysis instances; and populate the visualization with representations of these values and values of each explorer design solution.

In one variation, the computer system can: display a slider corresponding to each output characteristic in addition to the visualization within the user interface. The user then adjusts the slider to select a target characteristic range at the user interface to explore a new quantity of explore analysis instances including values of the output characteristic bound with this target characteristic range.

In one example, the computer system assists a user developing a van panel for an autonomous vehicle to reduce the stiffness of the van panel during manufacturing of the autonomous vehicle. In this example, the computer system interfaces with the user interface: to receive a virtual model, defining a geometry, for a van panel and an analytical function; to extract a set of input parameters, such as a stiffness depth, stiffness width, pocket rotation angle, and wheel arch depth from the virtual model; and to extract a set of output characteristics, such as stiffness and manufacturability from the virtual model and the analytical function. The computer system implements methods and techniques described above to pseudo-randomly select values of input parameters to insert into the analytical function and execute the analytical function to converge on values of output characteristics for the van panel and to generate a quantity of explore analysis instances for the van panel, including stiffness values and manufacturability values that conforms to the geometry (e.g., a total width of 127.215 millimeters, a first radius of curvature of 1001.474. millimeters, and a second radius of curvature of 446.947 millimeters) and the set of input parameters (e.g., a stiffness depth, stiffness width, pocket rotation angle, and wheel arch depth) of the van panel.

The user reviews the quantity of explore analysis instances and identifies absence of an explorer design solution with values that fall within the stiffness values, or the manufacturability values previously defined by the user. The user then adjusts a slider to select a new target stiffness range between 0.15 and 0.50 millimeters and, in response to receiving the target stiffness range between 0.15 and 0.50 millimeters at the user interface, the computer system implements regression, machine learning, and/or other techniques to generate a new quantity of explore analysis instances for the van panel such that each explorer design solution includes stiffness values approximating this target stiffness range.

In another variation, the computer system can: display a slider corresponding to each output characteristic in addition to the visualization within the user interface. The user then adjusts these selectable sliders to rank or prioritize each output characteristic at the user interface and the computer system can implement methods and techniques described above to explore a new quantity of explore analysis instances including values of output characteristics that correspond to the rank or prioritization of these output characteristics and present this new quantity of explore analysis instances to the user.

Therefore, the computer system can assist a user by presenting possible design solutions for the van panel exhibiting a single output characteristic within a target characteristic range and thereby, enable the user to quickly make informed decisions to accurately design a three-dimensional representation of a van panel prototype that meets both output characteristics of stiffness and manufacturability.

15.8 Multi-Target Characteristic Range+Multi-Parameter Exploration

In one implementation, the computer system can: receive selection of a set of target characteristic ranges at the user interface; and, in response to receiving selection of the set of target characteristic ranges, automatically generate a new quantity of explore analysis instances representing three-dimensional representations of the part including values within ranges of input parameters bounded with the set of target characteristic ranges.

In one example, similar to foregoing examples, the computer system assists a user developing a glider wing prototype to increase a payload or a weight such that the glider wing can support the increased payload for a particular distance. In order to review possible design solutions for the glider wing exhibiting a wing lift-to-drag coefficient ratio greater than 15—which enables the glider wing to support the payload for this particular distance—the user adjusts a selectable slider to select a first target characteristic range of an upper crest curvature range between −0.375 and 0.029 radians-per-meter and then adjusts a next selectable slider to select a second target characteristic range of a leading edge radius range between 0.045 and 0.076 meters in order to guide the computer system to generate explore analysis instances including values for a wing lift-to-drag coefficient ratio greater than 15.

The computer system can then: receive selection of the upper crest curvature range between −0.375 and 0.029 radians-per-meter and the leading edge radius range between 0.045 and 0.076 meters at the user interface; retrieve the aerodynamics module from the module database based on the output characteristic of the wing lift-to-drag coefficient ratio; and execute a subsonic simulation, defined in the aerodynamics module, to generate a quantity of explore analysis instances for the glider wing, each explorer design solution including values for the upper crest curvature approximating the upper crest curvature range between −0.375 and 0.029 radians-per-meter and for the leading edge within the leading edge radius range between 0.045 and 0.076 meters.

The computer system can: increase a weight of this new quantity of explore analysis instances for the glider wing greater than the weight of the first set of design solutions; generate a second visualization layer within the visualization representing the new quantity of explore analysis instances for the glider wing; and present the visualization within the user interface for the user to review this new quantity of explore analysis instances. Thus, the computer system can: generate a quantity of explore analysis instances responsive to selection of a target characteristic range at the user interface; return this quantity of explore analysis instances for the glider wing within the user interface; and, thereby, enable the user to quickly review the explorer quantity of design solutions and select a set of design solutions for the glider wing that include values of an output characteristic that meets the output characteristic range to further develop and manufacture.

Therefore, the computer system can: assist a user by presenting explore analysis instances for the glider wing including values of output characteristics within multiple output characteristic ranges rather than a single output characteristic range; and, thereby, enable the user to quickly and accurately design a three-dimensional representation of a glider wing prototype that achieves multiple output characteristics and design requirements.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing a textual descriptor, supplied by a user, of an engineering design project;
   extracting a first set of language signals from the textual descriptor;
   accessing a set of input parameters and a set of output characteristics for the engineering design project;
   querying the language model for a first characteristic range of values of a first input parameter, in the set of input parameters, exhibited within historical engineering solutions correlated with the first set of language signals, the first input parameter comprising a geometric variable;
   querying the language model for a second characteristic scalar value of a second input parameter, in the set of input parameters, exhibited within historical engineering solutions correlated with the first set of language signals, the second input parameter comprising a contextual variable; and
   accessing a first set of composite functions representing relationships between the set of input parameters and the set of output characteristics;
   accessing a virtual model representing a design solution for the engineering design project;
   linking a set of model variables in the virtual model to a subset of input parameters in the set of input parameters;
   accessing a first count of discover analysis instances for the engineering design project; and
   for each discover analysis instance in the first count of discover analysis instances:
      defining a unique combination of discover values of input parameters within corresponding characteristic ranges of the set of input parameters, the unique combination of discover values comprising:
         a first discover value of the first input parameter within the first characteristic range of values of the first input parameter; and
         a second discover value of the second input parameter comprising the second characteristic scalar value;
      generating a first model instance of the virtual model by modifying a first model variable in the virtual model according to the first discover value of the first input parameter;
      based on the first model instance, the first set of composite functions, and the second discover value of the second input parameter, executing a first discover analysis instance to calculate a set of discover values of the set of output characteristics; and rendering representations of the unique combination of discover values of input parameters and the set of discover values of the set of output characteristics within a user interface.

2. The method of claim 1:
wherein linking the set of model variables in the virtual model to the subset of input parameters in the set of input parameters comprises linking the first input parameter to the first model variable in the set of model variables in the virtual model.

3. The method of claim 1:
further comprising querying the language model for a second characteristic range of values of the second input parameter exhibited within historical engineering solutions correlated with the first set of language signals;
wherein linking the set of model variables in the virtual model to the subset of input parameters in the set of input parameters comprises linking the first input parameter to a first model variable in the set of model variables in the virtual model;
wherein defining the unique combination of discover values of input parameters for each discover analysis instance in the first count of discover analysis instances comprises:
defining the first unique combination of discover values of input parameters comprising:
a second discover value of the second input parameter within the second characteristic range of values of the second input parameter;
wherein rendering representations of the unique combination of discover values of input parameters and the set of discover values of the set of output characteristics within the user interface for each discover analysis instance in the first count of discover analysis instances comprises:
for the first discover analysis instance:
generating a first graphical representation of the first model instance; and
rendering the first graphical representation of the first model instance and the first set of discover values of the set of output characteristics within the user interface.

4. The method of claim 3:
wherein defining the unique combination of discover values of input parameters for each discover analysis instance in the first count of discover analysis instances further comprises:
for a second discover analysis instance in the first count of discover analysis instances:
defining a second unique combination of discover values of input parameters comprising:
a third discover value of the first input parameter within the first characteristic range of values of the first input parameter; and
a fourth discover value of the second input parameter within the second characteristic range of values of the second input parameter;
wherein executing the discover analysis instance for each discover analysis instance in the first count of discover analysis instances further comprises:
for the second discover analysis instance:
generating a second model instance of the virtual model by modifying the first model variable in the virtual model according to the third discover value of the first input parameter; and
based on the second model instance, the first set of composite functions, and the fourth discover value of the second input parameter, executing the second discover analysis instance to calculate a second set of discover values of the set of output characteristics; and
wherein rendering representations of a unique combination of discover values of input parameters and a set of discover values of the set of output characteristics within the user interface for each discover analysis instance in the first count of discover analysis instances further comprises:
initializing a table annotated with descriptors of the set of input parameters and the set of output characteristics;
for the first discover analysis instance:
populating a first column in the table with the first graphical representation of the first model instance, the first unique combination of discover values of input parameters, and the first set of discover values of the set of output characteristics within the user interface; and
for the second discover analysis instance:
generating a second graphical representation of the second model instance; and
populating a second column in the table with the second graphical representation of the second model instance, the second unique combination of discover values of input parameters, and the second set of discover values of the set of output characteristics within the user interface.

5. The method of claim 1:
wherein defining the unique combination of discover values of input parameters for each discover analysis instance in the first count of discover analysis instances comprises:
for each discover analysis instance in the first count of discover analysis instances:
defining the unique combination of discover values of input parameters comprising the first discover value of the first input parameter within the first characteristic range of values of the first input parameter; and
further comprising:
in response to execution of the first count of discover analysis instances, defining a first target range of values of the first input parameter narrowed from the first characteristic range of values by the user;
accessing a second count of explore analysis instances for the engineering design project; and
for each explore analysis instance in the second count of explore analysis instances:
defining a unique combination of explore values of input parameters comprising an explore value of the first input parameter within the first target range of values of the first input parameter;
based on the virtual model, the first set of composite functions, and the unique combination of explore values of input parameters, executing the explore analysis instance to calculate a set of explore values of the set of output characteristics; and
rendering representations of the unique combination of explore values of input parameters and the set of explore values of the set of output characteristics within the user interface.

6. The method of claim 5:
wherein accessing the first count of discover analysis instances comprises:
receiving a resource limit from the user;
estimating a resource allocation for each discover analysis instance; and
calculating the first count of discover analysis instances based on the resource limit and the resource allocation; and
wherein accessing the second count of explore analysis instances comprises:
accessing the second count of explore analysis instances less than the first count of discover analysis instances.

7. The method of claim 1:
wherein accessing the set of input parameters and the set of output characteristics for the engineering design project comprises:
identifying a first output characteristic in the set of output characteristics based on the first set of language signals;
further comprising:
defining a first target range of values of the first output characteristic based on an input entered by the user into the user interface;
wherein defining the unique combination of discover values of input parameters and executing the discover analysis instance for each discover analysis instance in the first count of discover analysis instances comprises:
for a first discover analysis instance in the first count of discover analysis instances:
defining a first unique combination of discover values of input parameters within corresponding characteristic ranges of the set of input parameters; and
based on the virtual model, the first set of composite functions, and the first unique combination of discover values of input parameters, executing the first discover analysis instance to calculate a first discover value of the first output characteristic; and
characterizing a first difference between the first discover value of the first output characteristic and the first target range of values of the first output characteristic; and
for a second discover analysis instance in the first count of discover analysis instances:
defining a second unique combination of discover values of input parameters within corresponding characteristic ranges of the set of input parameters and predicted to yield a second discover value of the second output characteristic differing from the first target range by less than the first difference; and
based on the virtual model, the second set of composite functions, and the second unique combination of discover values of input parameters, executing the second discover analysis instance to calculate the second discover value of the second output characteristic.

8. The method of claim 1, wherein rendering representations of a unique combination of discover values of input parameters and a set of discover values of the set of output characteristics within the user interface for each discover analysis instance in the first count of discover analysis instances comprises:

receiving selection of the first input parameter and a second input parameter, in the set of input parameters, from the user;
receiving selection of a first output characteristic, in the set of output characteristics, from the user; and
rendering a first three-dimensional plot depicting groups of values of the first input parameter, the second input parameter, and the first output characteristic corresponding to each discover analysis instance in the first count of discover analysis instances.

9. The method of claim 8:
further comprising:
querying the language model for a second characteristic range of values of the second input parameter exhibited within historical engineering solutions correlated with the first set of language signals;
prompting the user to isolate a three-dimensional region of interest, within the first three-dimensional plot, containing a subset of groups of values of the first input parameter, the second input parameter, and the first output characteristic corresponding to discover analysis instances in the first count of discover analysis instances;
defining a first target range of values of the first input parameter, narrower than the first characteristic range of values, bounded by the three-dimensional region of interest within the first three-dimensional plot;
defining a second target range of values of the second input parameter, narrower than the second characteristic range of values, bounded by the three-dimensional region of interest within the first three-dimensional plot;
accessing a second count of explore analysis instances for the engineering design project;
for each explore analysis instance in the second count of explore analysis instances:
defining a unique combination of explore values of input parameters comprising:
a first explore value of the first input parameter within the first target range of values of the first input parameter; and
a second explore value of the second input parameter within the second target range of values of the second input parameter; and
based on the virtual model, the first set of composite functions, and the unique combination of explore values of input parameters, executing the explore analysis instance to calculate a set of explore values of the set of output characteristics; and
rendering a second three-dimensional plot depicting groups of values of the first input parameter, the second input parameter, and the first output characteristic corresponding to each explore analysis instance in the second count of explore analysis instances.

10. The method of claim 8:
wherein receiving selection of the first output characteristic from the user comprises identifying the first output characteristic as a primary output characteristic of interest to the user based on the first set of language signals; and
wherein receiving selection of the first input parameter and the second input parameter from the user comprises:

deriving a set of correlations between the first output characteristic and each input parameter in the set of input parameters;
in response to a first correlation between the first output characteristic and the first input parameter and a second correlation between the first output characteristic and the second input parameter exceeding a threshold correlation:
generating a prompt to investigate the first output characteristic relative to the first input parameter and the second input parameter; and
serving the prompt to the user via the user interface; and
receiving selection of the first input parameter and the second input parameter from the user responsive to the prompt.

11. The method of claim 1, wherein accessing the set of input parameters and the set of output characteristics comprises:
querying the language model for output characteristics considered in design of historical engineering solutions correlated with the first set of language signals;
receiving a corpus of output characteristics and corresponding natural language descriptions from the language model;
presenting the corpus of output characteristics and corresponding natural language descriptions within the user interface; and
prompting the user to confirm the set of output characteristics, from the corpus of output characteristics, via the user interface.

12. The method of claim 1:
wherein accessing the set of input parameters and the set of output characteristics comprises:
detecting the set of model variables within the virtual model;
deriving a second set of language signals based on the set of model variables;
querying the language model for input parameters considered in design of historical engineering solutions correlated with the first set of language signals and the second set of language signals;
receiving a corpus of input parameters and corresponding natural language descriptions from the language model;
presenting the corpus of input parameters and corresponding natural language descriptions within the user interface; and
prompting the user to confirm the set of input parameters, from the corpus of input parameters, via the user interface.

13. The method of claim 1:
wherein accessing the set of input parameters and the set of output characteristics for the engineering design project comprises:
querying the language model for the first input parameter and a second output characteristic considered in design of historical engineering solutions correlated with the first set of language signals;
receiving a first natural language descriptor of the first input parameter from the language model; and
receiving a second natural language descriptor of the second output characteristic from the language model; and wherein accessing the first set of composite functions representing relationships between the set of input parameters and the set of output characteristics comprises:
querying a function library for:
a first function defining:
a first independent variable associated with a first set of language concepts congruent with the first natural language descriptor of the first input parameter; and
a first dependent variable associated with a second set of language concepts; and
a second function defining:
a second independent variable associated with a third set of language concepts; and
a second dependent variable associated with language concepts congruent with the second natural language descriptor of the second output characteristic; and
based on congruence between the second set of language concepts and the third set of language concepts:
connecting the first function and the second function to form a first composite function, in the first set of composite functions;
associating the first independent variable with the first input parameter; and
associating the second dependent variable with the second output characteristic.

14. The method of claim 13, wherein querying the function library and associating the first independent variable with the first input parameter comprises:
retrieving a first function comprising a first independent variable symbol associated with a first comment;
deriving the first set of language concepts from the first independent variable symbol and the first comment;
deriving a first correlation between the first set of language concepts and the first natural language descriptor of the first input parameter; and
in response to the first correlation exceeding a threshold:
selecting the first function for assembly into the first composite function; and
linking the first independent variable symbol in the first function to the first input parameter.

15. The method of claim 1:
wherein accessing the set of input parameters and the set of output characteristics for the engineering design project comprises:
querying the language model for the first input parameter considered in design of historical engineering solutions correlated with the first set of language signals; and
receiving a first natural language descriptor of the first input parameter from the language model;
wherein accessing the virtual model comprises accessing a parameterized computer-aided-drafting model; and
wherein linking the set of model variables in the virtual model to the subset of input parameters in the set of input parameters comprises:
detecting a first model variable, in the set of model variables, in the virtual model;
extracting a first language concept from a string of symbols defining the first model variable in the virtual model;
calculating a first correspondence between the first language concept and the first natural language descriptor; and in response to the first correspondence exceeding a threshold, linking the first input parameter to the first model variable.

16. The method of claim 1:
wherein accessing the set of input parameters and the set of output characteristics for the engineering design project comprises:
querying the language model for the first input parameter considered in design of historical engineering solutions correlated with the first set of language signals; and
receiving a first natural language descriptor of the first input parameter from the language model;
wherein accessing the virtual model comprises accessing a parameterized computer-aided-drafting model; and
wherein linking the set of model variables in the virtual model to the subset of input parameters in the set of input parameters comprises:
detecting a first model variable, in the set of model variables, in the virtual model;
defining a first test value and a second test value, different from the first test value, for the first model variable;
generating a first image of the virtual model rendered according to the first model variable set to the first test value;
generating a second image of the virtual model rendered according to the first model variable set to the second test value;
querying a language model for a second natural language descriptor of a difference between the first image and the second image;
calculating a first correspondence between the natural language descriptor and the second natural language descriptor; and
in response to the first correspondence exceeding a threshold, linking the first input parameter to the first model variable.

17. The method of claim 1:
further comprising:
detecting the set of model variables in the virtual model; and
extracting a second set of language signals, descriptive of the design solution, from symbols representing the set of model variables in the virtual model; and
wherein querying the language model for the characteristic range of values of the input parameter for each input parameter in the set of input parameters comprises, for each input parameter in the set of input parameters:
querying the language model for the characteristic range of values of the input parameter exhibited within historical engineering solutions correlated with:
the first set of language signals; and
the second set of language signals.

18. A method comprising, at a remote computer system:
accessing a virtual model representing a design solution for an engineering design project;
deriving a first set of language signals representing the engineering design project based on the virtual model;
querying the language model for a set of input parameters and a set of output characteristics considered in design of historical engineering solutions correlated with the first set of language signals;
receiving a first natural language descriptor of a first input parameter, in the set of input parameters, from the language model;
receiving a second natural language descriptor of a second output characteristic, in the set of output characteristics, from the language model;
for each input parameter in the set of input parameters:
querying a language model for a characteristic range of values of the input parameter exhibited within historical engineering solutions correlated with the first set of language signals;
accessing a first set of composite functions representing relationships between the set of input parameters and the set of output characteristics, the first set of composite functions comprising:
a first function defining:
a first independent variable associated with a first set of language concepts congruent with the first natural language descriptor of the first input parameter; and
a first dependent variable associated with a second set of language concepts; and
a second function defining:
a second independent variable associated with a third set of language concepts; and
a second dependent variable associated with language concepts congruent with the second natural language descriptor of the second output characteristic; and
linking a set of model variables in the virtual model to a subset of input parameters in the set of input parameters;
accessing a first count of discover analysis instances for the engineering design project; and
for each discover analysis instance in the first count of discover analysis instances:
defining a unique combination of discover values of input parameters within corresponding characteristic ranges of the set of input parameters;
based on the virtual model, the first set of composite functions, and the unique combination of discover values of input parameters, executing the discover analysis instance to calculate a set of discover values of the set of output characteristics; and
rendering representations of the unique combination of discover values of input parameters and the set of discover values of the set of output characteristics within a user interface.

19. The method of claim 18:
further comprising:
accessing a textual descriptor, supplied by a user, of the engineering design project; and
extracting a second set of language signals from the textual descriptor; and
wherein accessing the first set of composite functions comprises:
based on congruence between the second set of language concepts and the third set of language concepts:
connecting the first function and the second function to form a first composite function, in the first set of composite functions;
associating the first independent variable with the first input parameter; and
associating the second dependent variable with the second output characteristic;

wherein querying the language model for the characteristic range of values of the input parameter for each input parameter in the set of input parameters comprises, for each input parameter in the set of input parameters:
    querying the language model for a characteristic range of values of the input parameter exhibited within historical engineering solutions correlated with:
        the first set of language signals; and
        the second set of language signals.

20. A method comprising, at a remote computer system:
accessing a textual descriptor of an engineering design project;
extracting a first set of language signals from the textual descriptor;
accessing a virtual model representing a design solution for the engineering design project;
detecting a set of model variables within a virtual model;
deriving a second set of language signals based on the set of model variables;
querying a language model for input parameters considered in design of historical engineering solutions correlated with the first set of language signals and the second set of language signals;
receiving a corpus of input parameters and corresponding natural language descriptions from the language model;
presenting the corpus of input parameters and corresponding natural language descriptions within the user interface; and
prompting the user to confirm a set of input parameters, from the corpus of input parameters, via the user interface;
in response to receiving confirmation of the set of input parameters, querying a language model for characteristic range of values of input parameters, in the set of input parameters, exhibited within historical engineering solutions correlated with the set of language signals;
accessing a composite function representing a relationship between the set of input parameters and a set of output characteristics;
accessing a virtual model representing a design solution for the engineering design project;
accessing associations between a set of model variables in the virtual model and a subset of input parameters in the set of input parameters;
for each analysis instance in a count of analysis instances:
    defining a unique combination of values of input parameters within corresponding characteristic ranges; and
    based on the virtual model, the set of composite functions, and the unique combination of values of input parameters, executing the analysis instance to calculate a set of values of output characteristics; and
rendering representations of unique combinations of values of input parameters and corresponding sets of values of output characteristics, from the count of analysis instances, within a user interface.

* * * * *